United States Patent
Sethuraman et al.

(10) Patent No.: US 12,555,685 B2
(45) Date of Patent: Feb. 17, 2026

(54) SYSTEM AND METHOD FOR DETECTING AND PREDICTING SURGICAL WOUND INFECTIONS

(71) Applicant: Crely Inc., Oxnard, CA (US)

(72) Inventors: Arun Sethuraman, Singapore (SG); Michael Klum, Berlin (DE)

(73) Assignee: Crely Inc., Oxnard, CA (US)

( * ) Notice: Subject to any disclaimer, the term of this patent is extended or adjusted under 35 U.S.C. 154(b) by 351 days.

(21) Appl. No.: 17/959,464

(22) Filed: Oct. 4, 2022

(65) Prior Publication Data

US 2023/0106138 A1 Apr. 6, 2023

(30) Foreign Application Priority Data

Oct. 4, 2021 (SG) .......................... 10202111013W

(51) Int. Cl.
*G16H 50/30* (2018.01)
(52) U.S. Cl.
CPC .................................. *G16H 50/30* (2018.01)
(58) Field of Classification Search
CPC ....................................................... G16H 50/30
USPC ............................................................ 705/2
See application file for complete search history.

(56) References Cited

U.S. PATENT DOCUMENTS

| 12,165,052 B2* | 12/2024 | Khullar | G06N 3/045 |
| 2019/0209022 A1 | 7/2019 | Sobol et al. | |
| 2022/0238216 A1* | 7/2022 | Shelton, IV | G16H 40/40 |

FOREIGN PATENT DOCUMENTS

| WO | WO 2020/037244 A1 | 2/2010 |
| WO | WO 2021/097142 A1 | 5/2021 |
| WO | WO 2021/221948 A1 | 11/2021 |

OTHER PUBLICATIONS

Hughes, C. M. L., Jeffers, A., Sethuraman, A., Klum, M., Tan, M., & Tan, V. (2023). The detection and prediction of surgical site infections using multi-modal sensors and machine learning: Results in an animal model. Frontiers in Medical Technology, 5, 1111859. (Year: 2023).*

(Continued)

*Primary Examiner* — Mamon Obeid
*Assistant Examiner* — Winston Furtado
(74) *Attorney, Agent, or Firm* — Gerald T. Gray; Leydig, Voit & Mayer, LTD.

(57) ABSTRACT

A system and method for detecting and predicting surgical wound infections is disclosed. The method includes receiving wound site data, ambient data, reference site data and auxiliary data from one or more wearable devices, one or more sensing units or a combination thereof, a patient history data from electronic health record database, patient assessment data from a clinical professional, information associated with a patient from the patient or any combination thereof. The method further includes determining one or more desired parameters and extracting one or more features from the one or more desired parameters. The method includes applying the extracted one or more features into a trained Artificial Intelligence (AI) based data model and a trained statistical model for the patient. Further, the method includes detecting presence of an infection, predicting likelihood of infection and generating a wound infection score.

11 Claims, 16 Drawing Sheets

(56) References Cited

OTHER PUBLICATIONS

Kassal, P., Kim, J., Kumar, R., de Araujo, W. R., Steinberg, I. M., Steinberg, M. D., & Wang, J. (2015). Smart bandage with wireless connectivity for uric acid biosensing as an indicator of wound status. Electrochemistry Communications, 56, 6-10. (Year: 2015).*

Hu Z. et al., Automated detection of postoperative surgical site infections using supervised methods with electronic health record data. *Studies in health technology and informatics*, Oct. 19, 2017, vol. 216, pp. 706-710.

Sanger P. C. et al., A Prognostic Model of Surgical Site Infection Using Daily Clinical Wound Assessment. *Journal of the American College of Surgeons*, Aug. 1, 2017, vol. 223, No. 2, pp. 259-270.

Written Opinion of Application No. 10202111013W, filed Oct. 4, 2021.

Hu Z. et al., Automated detection of postoperative surgical site infections using supervised methods with electronic health record data. *Studies in Health technology and informatics*, (2015), vol. 216, pp. 706-710.

Sanger P. C. et al., A Prognostic Model of Surgical Site Infection Using Daily Clinical Wound Assessment. *Journal of the American College of Surgeons*, 1 (2016), vol. 223, No. 2, pp. 259-270.

* cited by examiner

Exemplary Raw Data Structure: Continuous Recording

| Ch.1 | Timestamp | NIRS | Timestamp | NIRS |
|---|---|---|---|---|
| Ch.2 | Timestamp | ACC, GYR | Timestamp | ACC, GYR |
| Ch.3 | Timestamp | MAG | Timestamp | MAG |
| Ch.4 | Timestamp | TEMP | Timestamp | TEMP |
| Ch.5 | Timestamp | 4W Impedance | Timestamp | 4W Impedance |
| Ch.6 | Timestamp | 2W Impedance | Timestamp | 2W Impedance |

6 sensor channels shown exemplarily over time. Each sensor channel may or may not have an individual sampling rate with may or may not be constant over time.

FIG. 3A

SYSTEM AND METHOD FOR DETECTING AND PREDICTING SURGICAL WOUND INFECTIONS

FIELD OF INVENTION

Embodiments of the present disclosure relate to a computing system, and particularly relates to a system and a method for detecting and predicting surgical wound infections.

BACKGROUND

According to Centers for Disease Control and Prevention (CDC) healthcare-associated infection (HAI) prevalence survey conducted during the year 2015, it was estimated that there were around 110,800 surgical site infections (SSIs) associated with inpatient surgeries. SSI is a type of healthcare-associated infection in which a surgical incision site may be infected after a surgical procedure. SSI is a common surgical complication occurring in about 3% of all surgical procedures and in up to 20% of patients undergoing emergency intra-abdominal procedures. Further, the SSIs may result in substantial morbidity due to which the patient has to stay in hospital for prolonged period. Also, treatment of such SSIs is very expensive. All of these factors have a substantial impact on patients and hospitals and create a huge economic burden on any given healthcare system. Therefore, minimizing the SSIs is a top priority for the surgeons and the hospitals to ensure safest environment for the patients undergoing surgery. Further, identifying the SSIs at its early stage plays a crucial role. Early identification of the SSIs allow surgeons to intervene early and remediate developing the SSIs in most efficient manner. Conventionally, the surgeons rely on physical observation of surgical wound to detect the SSIs. However, such detection of the SSIs through physical observation of the surgical wound is difficult before suppuration. Hence, there is a high likelihood that the SSIs may still be present and the surgeon may have failed to detect such SSIs. Thus, such conventional mechanism to detect the SSIs is prone to human errors, less reliable and causes significant time delay.

Hence, there is a need for an improved system and method for detecting and predicting surgical wound infections in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a cloud computing system for detecting and predicting surgical wound infections is disclosed. The cloud computing system includes one or more hardware processors and a memory coupled to the one or more hardware processors. The memory includes a plurality of modules in the form of programmable instructions executable by the one or more hardware processors. The plurality of modules include a data receiver module configured to receive at least one or a combination of: wound site data, ambient data, reference site data and auxiliary data from at least one of: one or more wearable devices and one or more sensing units, a patient history data from electronic health record database, patient assessment data from a clinical professional and information associated with a patient from the patient. The plurality of modules also include a parameter determination module configured to determine one or more desired parameters including: primary physiological signals, derived physiological signals, local wound parameters, systemic parameters, patient history, current patient assessment, symptoms reported by the patient, ambient data, reference site parameters, auxiliary data, and audio/visual data. The one or more desired parameters are determined based on the received at least one or a combination of: the wound site data, the ambient data, the reference site data and the auxiliary data from at least one of: the one or more wearable devices and the one or more sensing units, the patient history data from the electronic health record database, the patient assessment data from the clinical professional and information associated with the patient from the patient. The plurality of modules further include a feature extraction module configured to extract one or more features from the one or more desired parameters. The one or more features include: energy, maximum, minimum, median, entropy, complexity, fractal dimension, distinct points comprising peaks, valleys, zero crossings, and inflection points, transformations and their coefficients as well as features within the transformed signals where transformations include but are not limited to Laplace, Fourier, wavelet, cosine, further statistical moments, coefficients of functional fits, normalization parameters, dimensionality reduced versions, principal components, linear discriminant analysis, percentiles, and the like. Furthermore, the plurality of modules include an inference module configured to apply the extracted one or more features into at least one of: a trained Artificial Intelligence (AI) based data model and a trained statistical model for the patient. Also, the plurality of modules include a data management module configured to perform at least one of or a combination of: detecting presence of an infection around proximal region of the surgical wound area based on one of: the trained AI based data model and the trained statistical model, predicting likelihood of infection around the proximal region of the surgical wound area based on one of: the trained AI based data model and the trained statistical model, and generating a wound infection score for assessing severity of the infection based on one of: the trained AI based data model and the trained statistical model.

In accordance with another embodiment of the present disclosure, a method for detecting and predicting surgical wound infections is disclosed. The method includes receiving at least one or a combination of: wound site data, ambient data, reference site data and auxiliary data from at least one of: one or more wearable devices and one or more sensing units, a patient history data from electronic health record database, patient assessment data from a clinical professional and information associated with a patient from the patient. The method also includes determining one or more desired parameters including: primary physiological signals, derived physiological signals local wound parameters, systemic parameters, patient history, current patient assessment, symptoms reported by the patient, ambient data, reference site parameters, auxiliary data, and audio/visual data. The one or more desired parameters are determined based on the received at least one or a combination of: the wound site data, the ambient data, the reference site data and the auxiliary data from at least one of: the one or more wearable devices and the one or more sensing units, the patient history data from the electronic health record database, the patient assessment data from the clinical professional and information associated with the patient from the patient. The method further includes extracting one or more features from the one or more desired parameters. The one or more features include: energy, maximum, minimum, median, entropy, complexity, fractal dimension, distinct points comprising peaks, valleys, zero crossings, and inflection points, transformations and their coefficients as well as features within the transformed signals where transformations include but are not limited to Laplace, Fourier, wavelet, cosine, further statistical moments, coefficients of functional fits, normalization parameters, dimensionality reduced versions, principal components, linear discriminant analysis, percentiles, and the like. Further, the method includes applying the extracted one or more features into at least one of: a trained Artificial Intelligence (AI) based data model and a trained statistical model for the patient. Also, the method includes performing at least one of or a combination of: detecting presence of an infection around proximal region of the surgical wound area based on one of: the trained AI based data model and the trained statistical model, predicting likelihood of infection around the proximal region of the surgical wound area based on one of: the trained AI based data model and the trained statistical model and generating a wound infection score for assessing severity of the infection based on one of: the trained AI based data model and the trained statistical model.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3A-E is pictorial depiction illustrating exemplary method of data extraction and processing, in accordance with an embodiment of the present disclosure;

Figure 1:
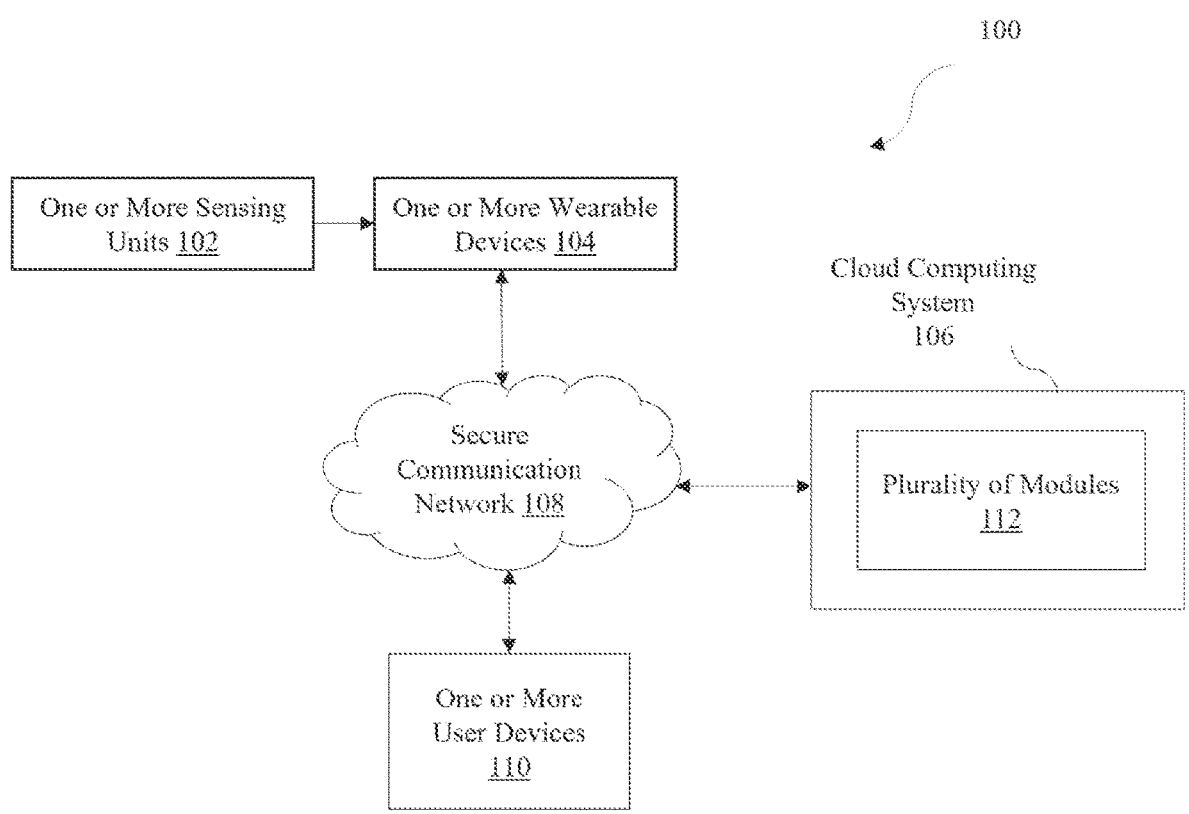
FIG. 1 is a block diagram illustrating an exemplary computing environment capable of detecting and predicting surgical wound infections, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 capable of detecting and predicting surgical wound infections, in accordance with an embodiment of the present disclosure. According to FIG. 1, the computing environment 100 includes one or more sensing units 102 placed around surgical wound area (also referred herein as 'wound site') and one or more wearable devices 104 operably coupled to the one or more sensing units 102. In an alternate embodiment of the present disclosure, the one or more sensing units 102 may also be placed on one or more parts of patient body other than the surgical wound area. In other words, there can also exist sites or areas on the patient body where no wound is present however a sensor is attached. Such areas or sites are deemed as a reference site. In an embodiment of the present disclosure, information may be extracted from the wound site, the reference site as well as from differential measurements between the wound and reference sites. The one or more sensing units 102 and the one or more wearable devices 104 may extract information from surgical wound area, the one or more parts of the patient body as well as differential measurements between the two. Further, the one or more wearable devices 104 are communicatively coupled to a cloud computing system 106 via a secure communication network 108. The cloud computing system 106 may be a cloud server or a remote server. In an exemplary embodiment of the present disclosure, the secure communication network 108 may be any wireless network such as Wireless Fidelity (Wi-Fi), Bluetooth or the like. The secure communication network 108 may also be a Wide Area Network (WAN). In an exemplary embodiment of the present disclosure, the WAN may be 3G, 4G, 5G network and the like. In an embodiment of the present disclosure, the secure communication network 108 may be a hardware device which may use one or more communication protocols to receive data from the one or more wearable devices 104 and transmit the received data to the cloud computing system 106. In an exemplary embodiment of the present disclosure, the one or more communication protocols include Bluetooth Low Energy (BLE), Low-Power Wide-Area Network (LPWAN), Zigbee, Long Term Evolution (LTE-M), Near Field Communication (NFC) and the like. Furthermore, the cloud computing system 106 is communicatively coupled with one or more user devices 110 via the secure communication network 108. The one or more user devices 110 may be associated with one or more healthcare providers. In an exemplary embodiment of the present disclosure, the one or more user devices 110 include a laptop computer, desktop computer, tablet computer, smartphone, wearable device, smart watch and the like.

The one or more user devices 110 includes a local browser, a mobile application or a combination thereof. Further, each healthcare provider may use a web application via the local browser, the mobile application or a combination thereof to communicate with the cloud computing system 106. Further, the one or more sensing units 102 are configured to capture one or more physiological changes as sensor readings. In an exemplary embodiment of the present disclosure, the one or more physiological changes include electrical activity, temperature of the body surface, optical properties of the tissue, body movement, electrical properties of the tissue, mechanical activity of the heart, muscle tension and the like. The sensor readings include electrical potential difference on the skin, emitted IR light on the skin, intensity of light returned from the illuminated tissue, complex tissue impedance, pressure difference on the skin over time, electrical potential difference on the skin, acceleration, gyroscopic and magnetic intensity and the like. In an embodiment of the present disclosure, the complex tissue impedance is over a frequency range of at least DC to 10 MHz or a subset of the frequency range. The one or more sensing units 102 are also configured to transmit the one or more physiological changes to one or more wearable devices 104 via data cables or direct wireless communication. Furthermore, the cloud computing system 106 comprises a plurality of modules 112. Details on the plurality of modules 112 have been elaborated in subsequent paragraphs of the present description with reference to FIG. 2.

In an embodiment, the cloud computing system 106 is configured to detect and predict surgical wound infections. In detecting and predicting the surgical wound infections, the cloud computing system 106 receives wound site data, ambient data, reference site data and auxiliary data from one or more wearable devices 104, one or more sensing units 102 or any combination thereof, a patient history data from electronic health record database, patient assessment data from a clinical professional, information associated with the patient from the patient or any combination thereof. In an embodiment of the present disclosure, the secure communication network 108 may save and encrypt the wound site data, the ambient data, the reference site data, the auxiliary data, the patient history data, the patient assessment data, the information associated with the or any combination thereof to enhance data security. Further, the cloud computing system 106 determines one or more desired parameters based on the received wound site data, the received ambient data, the received reference site data and the received auxiliary data from the one or more wearable devices 104, the one or more sensing units 102 or any combination thereof, the received patient history data from the electronic health record database, the received patient assessment data from the clinical professional, the received information associated with the patient from the patient or any combination thereof. In an exemplary embodiment of the present disclosure, the one or more desired parameters include primary physiological signals, derived physiological signals, local wound parameters, systemic parameters, patient history, current patient assessment, symptoms reported by the patient, ambient data, reference site parameters, auxiliary data, audio/visual data and the like. In an alternate embodiment of the present disclosure, the one or more wearable devices 104 extract primary physiological signals from the sensor readings by using signal processing techniques. Furthermore, the one or more wearable devices 104 may also process the primary physiological signals by using signal processing techniques in order to extract the derived physiological signals. Thus, even if there is no internet connectivity, the one or more wearable devices 104 may generate one or more alerts based on the derived physiological signals and output the generated one or more alerts to the one or more healthcare providers. For example, when heartrate of the patient is below a predefined threshold, one or more alerts corresponding to the heartrate of the patient is generated and the generated one or more alerts may be outputted to the one or more healthcare providers.

In an embodiment of the present disclosure, the secure communication network 108 receives status and error messages from the one or more wearable devices 104. The secure communication network 108 may also generate status and error messages. Further, the secure communication network 108 performs a set of predefined actions to remediate the errors associated with the status and error messages. The set of predefined actions may include generating and transmitting one or more alerts to the secure communication network 108, the one or more wearable devices 104, one or more sensing units 102 one or a combination thereof based on severity of the errors. The set of predefined actions may also include restarting the one or more wearable devices 104. In an exemplary embodiment of the present disclosure, the one or more alerts may be in form of silent, visual, audio visual and the like. Further, the error and status messages may also be transmitted to the cloud computing system 106 for notifying the one or more healthcare providers about the error and status messages. In an embodiment of the present disclosure, when the errors may be sufficiently critical, the one or more alerts may also be transmitted to the one or more user devices 110 via the cloud computing system 106. In an embodiment of the present disclosure, the secure communication network 108 may also be responsible for extracting the derived physiological signals by processing the primary physiological signals.

Further, the cloud computing system 106 also extracts one or more features from the one or more desired parameters. In an exemplary embodiment of the present disclosure, the one or more features include energy, maximum, minimum, median, entropy, complexity, fractal dimension, distinct points comprising peaks, valleys, zero crossings, and inflection points, transformations and their coefficients as well as features within the transformed signals where transformations include but are not limited to Laplace, Fourier, wavelet, cosine, further statistical moments, coefficients of functional fits, normalization parameters, dimensionality reduced versions, principal components, linear discriminant analysis, percentiles, and the like. Furthermore, the cloud computing system 106 applies the extracted one or more features into a trained Artificial Intelligence (AI) based data model, a trained statistical model or a combination thereof for the patient. Furthermore, the cloud computing system 106 detects presence of an infection around proximal region of the surgical wound area, predicts likelihood of infection around the proximal region of the surgical wound area, generate a wound infection score for assessing severity of the infection or any combination thereof based on the output of the trained AI based data model or the trained statistical model or any combination thereof.

In an exemplary embodiment of the present disclosure, the above-mentioned method steps are performed by a system, such as cloud computing system 106. However, in an alternative embodiment of the present disclosure, the above-mentioned method steps can also be performed at any of the components of the computing environment 100, such as one or more wearable devices 104, the cloud computing system 106 and the secure communication network 108 to achieve distributed processing, as shown in FIG. 1. Thus, the distributed processing ensures that if one or more wearable devices 104, the cloud computing system 106 or the secure communication network 108 fail, the computing environment 100 may still perform one or more functions for the detection and prediction of surgical wound infections, such as giving alarms if pre-set threshold of the one or more desired parameters are exceeded. In an embodiment of the present disclosure, the secure communication network 108 may itself act as the cloud computing system 106 for carrying out partial processing to detect and predict surgical wound infections for performing method steps as described above. In an embodiment of the present disclosure, the secure communication network 108 may also perform classification and prediction tasks as performed by the cloud computing system 106. In an exemplary embodiment of the present disclosure, the one or more wearable devices 104 may itself act as the cloud computing system 106 for carrying out partial processing to detect and predict surgical wound infections for performing method steps as described above.

Figure 2:
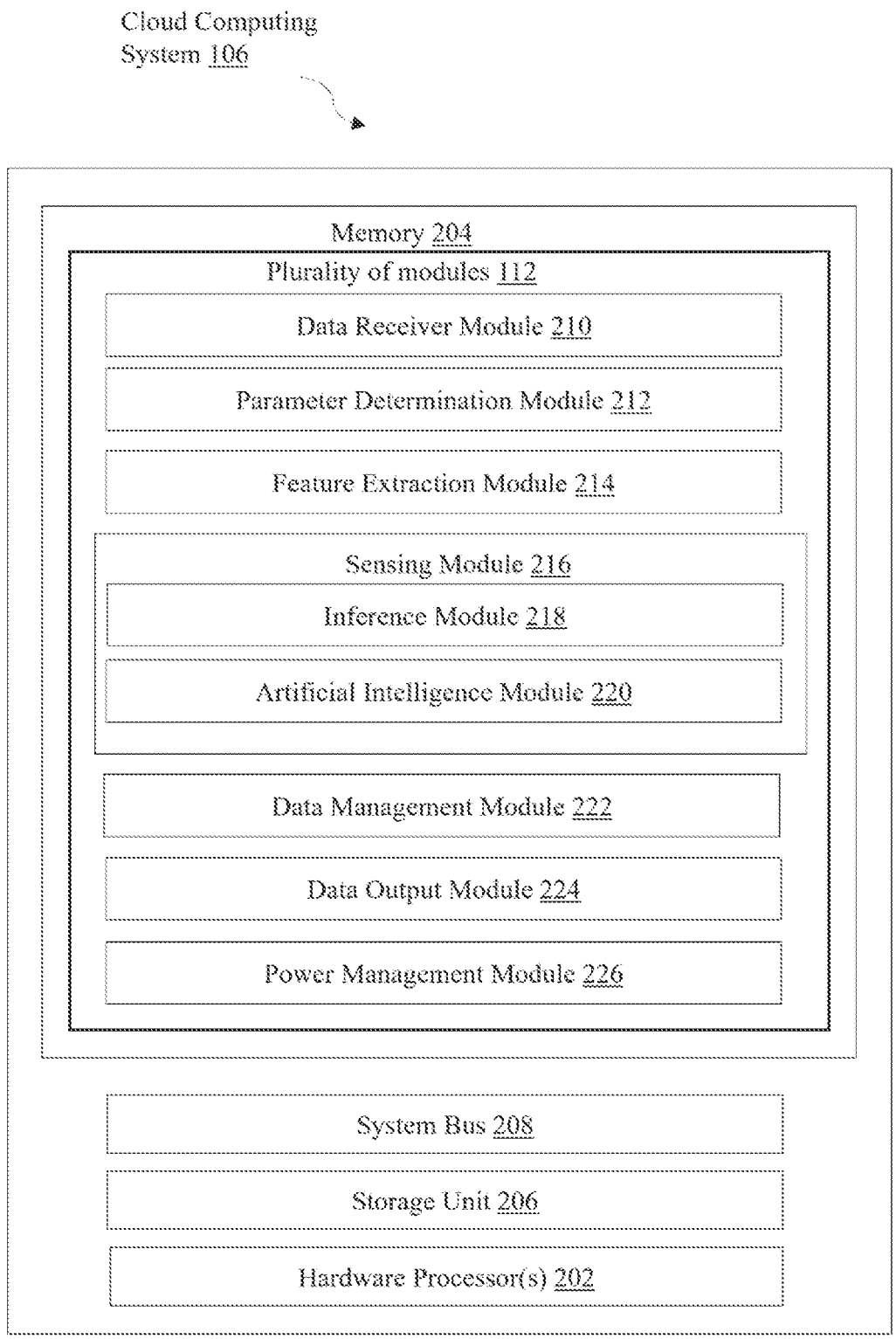
FIG. 2 is a block diagram illustrating an exemplary cloud computing system, such as those shown in FIG. 1, capable of detecting and predicting the surgical wound infections, in accordance with an embodiment of the present disclosure.

FIG. 2 is a block diagram illustrating an exemplary cloud computing system 106, such as those shown in FIG. 1, capable of detecting and predicting surgical wound infections. The cloud computing system 106 comprises one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 112 in the form of programmable instructions executable by the one or more hardware processors 202. Further, the plurality of modules 112 includes a data receiver module 210, a parameter determination module 212, a feature extraction module 214, a sensing module 216, an inference module 218, an artificial intelligence module 220, a data management module 222, a data output module 224 and a power management module 226.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In the present embodiment, the memory 204 includes the plurality of modules 112 stored in the form of machine-readable instructions on any of the above-mentioned storage media and may be in communication with and executed by the one or more hardware processors 202.

The storage unit 206 may be a cloud storage. The storage unit 206 may store wound site data, ambient data, reference site data, auxiliary data, a patient history data, patient assessment data and information associated with a patient. The storage unit 206 may also store primary physiological signals, derived physiological signals, local wound parameters, systemic parameters, patient history, current patient assessment, symptoms reported by the patient, ambient data, reference site parameters, auxiliary data, audio/visual data, wound infection score, past medical outcomes, one or more medical recommendations and the like.

The data receiver module 210 is configured to receive wound site data, ambient data, reference site data and auxiliary data from at least one or combination of: one or more wearable devices 104, one or more sensing units 102, a patient history data from electronic health record database, patient assessment data from a clinical professional, information associated with the patient from the patient or any combination thereof. In an embodiment of the present disclosure, the received data may be separated into segments of any lengths. For example, the received data may be separated into time-stamped 30-minute-long segments. In an alternate embodiment, the received data may also be a continuous data. In an embodiment of the present disclosure, the wound site data is captured from surgical wound area of the patient. In an exemplary embodiment of the present disclosure, the wound site data includes skin temperature, plethysmogram, $SpO_2$, $StO_2$ complex tissue impedance, electrodermal activity, Electromyogram (EMG), respiration rate, perfusion index, intensity of light returned from illuminated tissue, acceleration, gyroscopic and magnetic field strength, body impedance value, Electrocardiogram (ECG), electric potential difference on the skin, ECG based heart rate, heart rate variability, impedance pneumography, impedance cardiogram, BCG based heart rate, PCG based heart rate, respiration rate, variability, emitted IR light on the skin, pulse rate, activity, posture, position, step count, pressure differences on the skin over time, Phonocardiogram (PCG), Ballistocardiogram (BCG), cardiovascular parameters, electrical activity of the heart, temperature of body surface, optical properties of the tissue, body movement, mechanical activity of the heart, muscle tension, electrical potential difference on the skin and the like. The reference site data is captured from one or more parts of the patient body other than the surgical wound area of the patient. In an embodiment of the present disclosure, the reference site data is similar to the wound site data and includes all the above-mentioned data of the wound site data, however these data are captured from a different location. In other words, reference site data includes same data as that of the wound site data mentioned above but for a different location on patient body. Further, the ambient data include temperature, humidity, air quality, acoustical noise level, brightness and the like. The auxiliary data include Personal Identifiable Information (PII), dates, timestamps, status information associated with the one or more sensing units 102 and the one or wearable devices 104 and the like. The PII may be the information used to identify the patient, such as name and contact information of the patient. The patient may also be identified via a medical record number associated with the patient. In an embodiment of the present disclosure, the patient assessment data include data associated with monitoring of the patient and follow-ups conducted by the clinical professional in the hospital or outpatient setting. The patient history data includes demographic information, vital signs, diagnoses, medications, lab and test results, BMI, medical history, habits, such as smoking, sport and the like, chronic diseases, acute diseases, age and the like. Further, information associated with the patient received from the patient include one or more symptoms reported by the patient. Details on the one or more wearable devices 104 and one or more sensing units 102 have been elaborated in subsequent paragraphs of the present description with reference to FIG. 4.

Further, the received wound site data, the received ambient data, the received reference site data, the received auxiliary data, the received patient history data, the received patient assessment data and the received information associated with the patient are in encrypted form. The one or more wearable devices 104 and the cloud computing system 106 may use two-factor authentication for the purpose of data security. In an embodiment of the present disclosure, each wearable device has a unique key and the cloud computing system 106 has to confirm the unique key to authenticate its identity. The cloud computing system 106 may have to confirm the unique key in a predefined period of time. The one or more wearable devices 104 transmits the wound site data, the ambient data, the reference site data, the auxiliary data, the patient history data, the patient assessment data and the information associated with the patient to the cloud computing system 106 only when the identity of the cloud computing system 106 may be authenticated. In an exemplary embodiment of the presented disclosure, all communication paths between the one or more wearable device, the cloud computing system 106, the secure communication network 108 and the one or more user devices 110 are implemented using a "zero trust approach" to enhance data security. When a patient removes the unique key, the one or more wearable devices 104 may not transmit the wound site data, the ambient data, the reference site data, the auxiliary data, the patient history data, the patient assessment data and the information associated with the patient to the cloud computing system 106.

In an embodiment of the present disclosure, the received wound site data, the received ambient data, the received reference site data, the received auxiliary data, the received patient history data, the received patient assessment data and the received information associated with the patient are locally preprocessed by the one or more wearable devices 104 attached on one or more parts of the patient body.

The parameter determination module 212 is configured to determine one or more desired parameters based on the received wound site data, the received ambient data, the received reference site data and the received auxiliary data from the one or more wearable devices 104, the one or more sensing units 102 or any combination thereof, the received patient history data from the electronic health record database, the received patient assessment data from the clinical professional, the received information associated with the patient from the patient or any combination thereof. In an exemplary embodiment of the present disclosure, the one or more desired parameters include primary physiological signals, derived physiological signals, local wound parameters, systemic parameters, patient history, current patient assessment, symptoms reported by the patient, ambient data, reference site parameters, auxiliary data, audio/visual data and the like.

In an exemplary embodiment of the present disclosure, the primary physiological signals include ECG, skin temperature, Plethysmogram, $StO_2$ activity, posture, position, complex tissue impedance, electrodermal activity, impedance, pneumography, impedance, cardiogram, PCG, BCG, EMG and the like. In an embodiment of the present disclosure, each of the primary physiological signals are captured from one or more physiological changes detected by the one or more sensing units 102, the one or more wearable devices 104 or a combination thereof. The one or more physiological changes include electrical activity, temperature of the body surface, optical properties of the tissue, body movement, electrical properties of the tissue, mechanical activity of the heart, muscle tension and the like. In an embodiment of the present disclosure, the one or more physiological changes are captured in the form of sensor readings in order to generate the primary physiological signals. For example, the sensor reading is electrical potential difference on the heart from the electrical activity of the heart (one of the physiological signals). Details on the primary physiological signals have been elaborated in subsequent paragraphs of the present description with reference to FIG. 7.

Further, the derived physiological signals include ECG based heart rate, respiration rate, heart rate variability, pulse rate, respiration rate, $SpO_2$, perfusion index, step count, PCG based heart rate, BCG, cardiovascular parameters and the like. In an embodiment of the present disclosure, the derived physiological signals are derived from the primary physiological signals. For example, the derived physiological signals, such as heart rate, are derived from ECG (which is a primary physiological signal). Details on the derived physiological signals have been elaborated in subsequent paragraphs of the present description with reference to FIG. 7.

In an embodiment of the present disclosure, each of the primary physiological signals and the derived physiological signals associated with both the wound site data and the reference site data are being classified as local wound parameters, systemic parameters or a combination thereof. Hence, the local wound parameters may include primary physiological signals, derived physiological signals, reference site parameters or any combination thereof. Similarly, the systemic parameters may include primary physiological signals, derived physiological signals, reference site parameters or any combination thereof. In an exemplary embodiment of the present disclosure, the local wound parameters may include tissue oxygenation (StO2), skin temperature, complex tissue impedance, electrodermal activity, EMG, plethysmogram, perfusion index and the like. The systemic parameters may include ECG, Heart Rate, Respiration Rate, Heart Rate Variability, Pulse Rate, Respiration Rate, SpO2, Activity, Posture, Position, Step count, Cardiovascular parameters, EMG and the like. In an embodiment of the present disclosure, the audio/visual data may include one or more images, one or more videos or a combination thereof captured by the patient to consult the clinical professional.

The feature extraction module 214 is configured to extract one or more features from the one or more desired parameters. In an exemplary embodiment of the present disclosure, the one or more features include, maximum, minimum, median, entropy, complexity, fractal dimension, distinct points comprising peaks, valleys, inflection points and the like.

The sensing module 216 includes the inference module 218 and the artificial intelligence module 220. The inference module 218 is configured to apply the extracted one or more features into a trained Artificial Intelligence (AI) based data model or a trained statistical model for the patient or a combination thereof. In an exemplary embodiment of the present disclosure, the trained AI based data model and the trained statistical model include decision trees, Random forests Logistic Regression, Multilayer Perceptron (MLP), Support Vector Machine (SVM), Recurrent Artificial Neural Network (ANN), Long Short-Term Memory (LSTM), Time Delay Neural Network (TDNN), Dynamic Bayesian Networks, Hidden Markov Models, Deep Learning Architectures, Ensemble models, Stacked models and the like. Before using the trained AI based data model or the trained statistical model, it is required to train the AI based data model and the statistical model for detecting presence of the infection, predicting likelihood of the infection, generating the wound infection score and the like. In an embodiment of the present disclosure, the artificial intelligence module 220 is configured to train the AI based data model and the statistical model based on the extracted one or more features and past medical outcomes pre-stored in the storage unit 206. In training the AI based data model and the statistical model based on the extracted one or more features and the past medical outcomes pre-stored in the storage unit 206, the artificial intelligence module 220 maps the extracted one or more features with the past medical outcomes. Further, the artificial intelligence module 220 assigns a weightage to each of the mapped one or more features with the past medical outcomes. The weightage may be a nonlinear function. The artificial intelligence module 220 trains the AI based data model, the statistical model or a combination thereof for the patient based on the one or more features and the past medical outcomes.

The data management module 222 is configured to detect presence of an infection around proximal region of the surgical wound area, predicts likelihood of infection around the proximal region of the surgical wound area, and generate a wound infection score for assessing severity of the infection or any combination thereof based on the trained AI based data model or the trained statistical model or any combination thereof.

The data output module 224 is configured to output the detected presence of the infection, the predicted likelihood of the infection and the generated wound infection score to one or more user devices 110 associated with one or more healthcare providers via the secure communication network 108. In an embodiment of the present disclosure, the one or more healthcare providers may access the detected presence of the infection, the predicted likelihood of the infection and the generated wound infection score by using the web application or mobile application on the one or more user devices 110. In outputting the detected presence of the infection, the predicted likelihood of the infection and the generated wound infection score to the one or more user devices 110 associated with the one or more healthcare providers via the secure communication network 108, the data output module 224 publishes the detected presence of the infection, the predicted likelihood of the infection and the generated wound infection score to the one or more user devices 110 associated with the one or more healthcare providers via the secure communication network 108. Further, the data output module 224 receives one or more medical recommendations for reducing the likelihood of infection from the one or more user devices 110 associated with the one or more healthcare providers. In an embodiment of the present disclosure, the data output module 224 receives the one or more medical recommendations from the data management module 222. Thus, the cloud computing system 106 generates the one or more medical recommendations based on output of the artificial intelligence module 220. In an embodiment of the present disclosure, the data output module 224 may facilitate collaboration between the one or more healthcare providers to discuss best course of treatment for reducing the likelihood of infection. The data output module 224 transmits the received one or more medical recommendations for reducing the likelihood of infection to the one or more healthcare providers. In an embodiment of the present disclosure, the one or more health care providers may access the one or more medical recommendations by using the web application or mobile application on the one or more user devices 110. The one or more medical recommendations may be in the form of vocal, haptic and visual modes and at a frequency determined by the one or more healthcare providers. The frequency is a rate at which the one or more healthcare providers requires the one or more medical recommendations. For example, the one or more healthcare providers may require the one or more medical recommendations daily, weekly or monthly. The one or more recommendations may be stored in the storage unit 206. In an embodiment of the present disclosure, the cloud computing system 106 may include connectors such as Application Programming Interfaces (APIs) to transfer data stored in the storage unit 206 to third party systems.

The power management module 226 is configured to control power functions of the one or more wearable devices 104 attached on one or more parts of the patient body and the one or more sensing units 102 attached around surgical wound area of the patient. In an embodiment of the present disclosure, the power functions are controlled by tuning performance of a system resource associated with the one or more wearable devices 104, deactivating specific components of the one or more sensing units 102, the one or more wearable devices 104 or a combination thereof to conserve power or a combination thereof based on the trained AI based data model or the statistical model. In an exemplary embodiment of the present disclosure, tuning performance of the system resource include reducing sampling rate, disabling one or more sensing units 102, switching to intermittent sampling modes, sampling based on one or more events or any combination thereof. In an exemplary embodiment of the present disclosure, the one or more events include movements, rapidly changing signals and the like. The sampling rate may also be increased based on the one or more events.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of the cloud computing system 106 as is unique to the present disclosure or necessary for an understanding of the present disclosure is depicted and described. The remainder of the construction and operation of the cloud computing system 106 may conform to any of the various current implementation and practices known in the art.

Figure 3B:
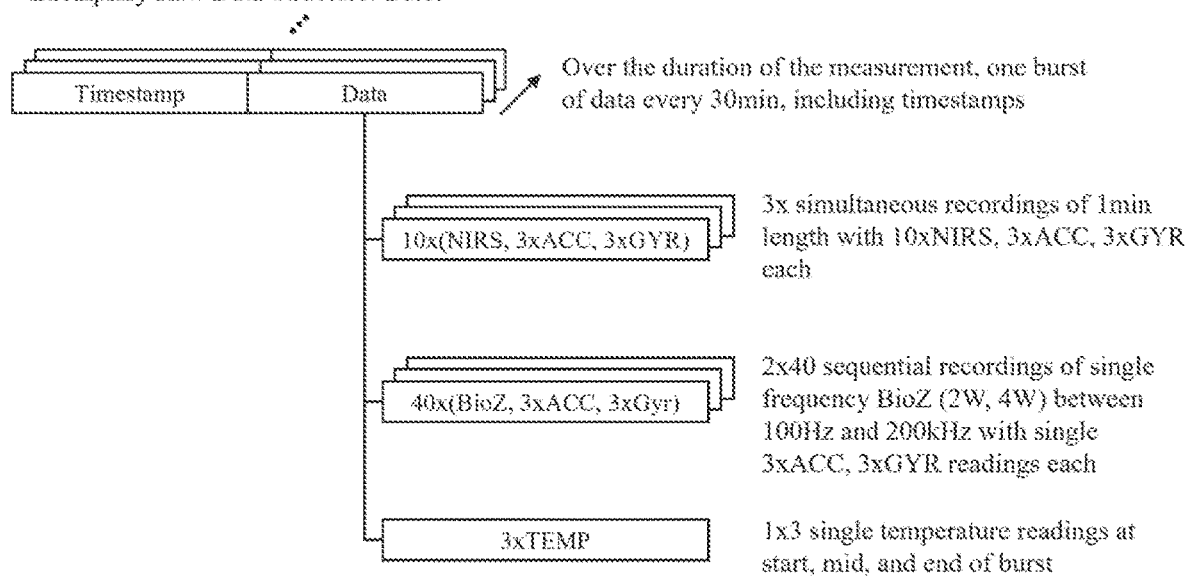

FIG. 3A-E is pictorial depiction illustrating exemplary method of data extraction and processing, in accordance with an embodiment of the present disclosure. FIG. 3A is a pictorial depiction illustrating exemplary implementations of raw data from multiple sites. In an exemplary embodiment of the present disclosure, six sensor channels are shown in FIG. 3A. Each sensor channel may or may not have individual sampling rate which may or may not be constant over time. Each sample or collections of samples in every channel may be timestamped individually. FIG. 3B is a pictorial depiction illustrating exemplary overview of an internal data structure to visualize an exemplary selection of the sensor readings of the patient captured by the one or more sensing units 102 and the one or more wearable devices 104 in an interlaced measurement mode and burst mode. The system, such as the one or more sensing units 102 and the one or more wearable devices 104, may be configured with different sensor combinations, different sampling rates, measurement modes and the like. In interlaced measurement mode, Bioimpedance (BioZ) measurements are not captured simultaneously as no two BioZ system may be captured at the same time. In an embodiment of the present disclosure, one or more parameters, such as 12 days duration, one set of data every 30 min, one-minute NIRS recording, given frequency ranges, number of channels and the like are mere examples. In an exemplary embodiment of the present disclosure, the BioZ may be a 2 W or 4 W measurement. For example, 2 sites BioZ, 3 sites NIRS and 1 site temperature. In an embodiment of the present disclosure, same site may have multiple runs or configurations. The same image may be interpreted as 1 site BioZ but with different measurement modes, such as 2 W and 4 W which are conducted sequentially.

In burst mode, bursts of measurements are spaced out in a certain amount of time. Further, each burst data may be sampled continuously for a predefined amount of time (1 min NIRS and ACC, GYR), multiple points over a frequency range (BioZ), or at given single time instances within the burst, for example at the start (Temperature). In an embodiment of the present disclosure, interlaced may only be applied to the BioZ. Further, the NIRS is captured in parallel to Inertial Measurement Unit (IMU) data including acceleration, gyroscopic and magnetic measurements. The BioZ is also captured in parallel to the IMU data.

Figure 3C:
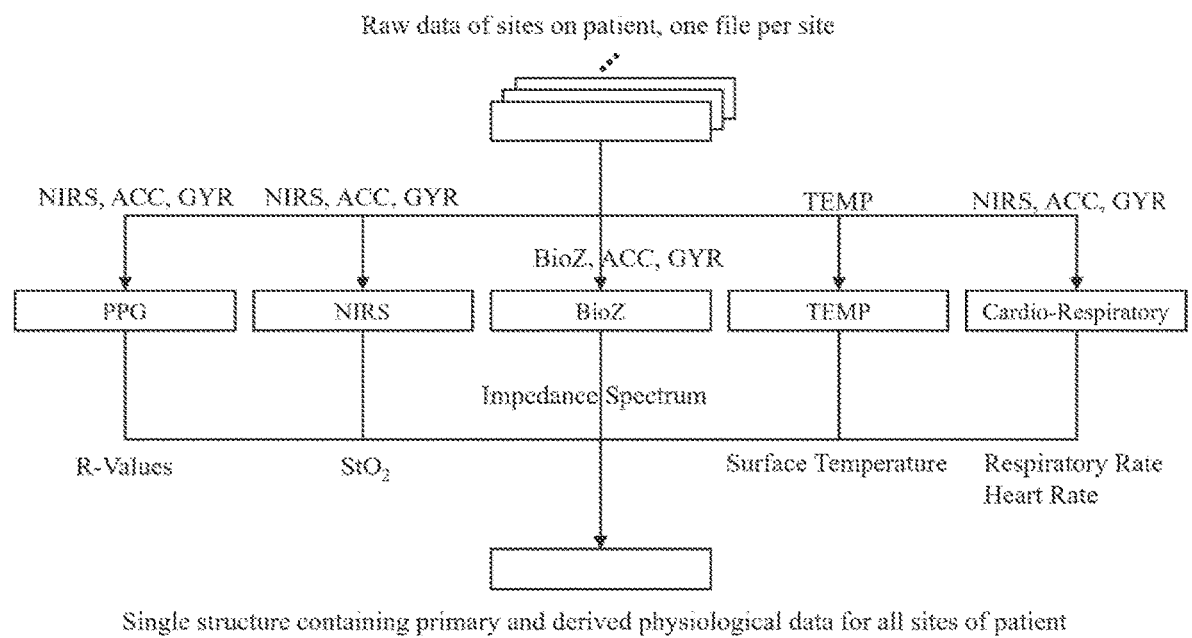

Further, FIG. 3C is a pictorial depiction illustrating exemplary selection of primary and derived physiological signal extraction. The cardio-respiratory physiological signals may be derived from the NIRS signals, the IMU data, the ECG signals, or any other sensor readings or any combinations thereof.

Figure 3D:
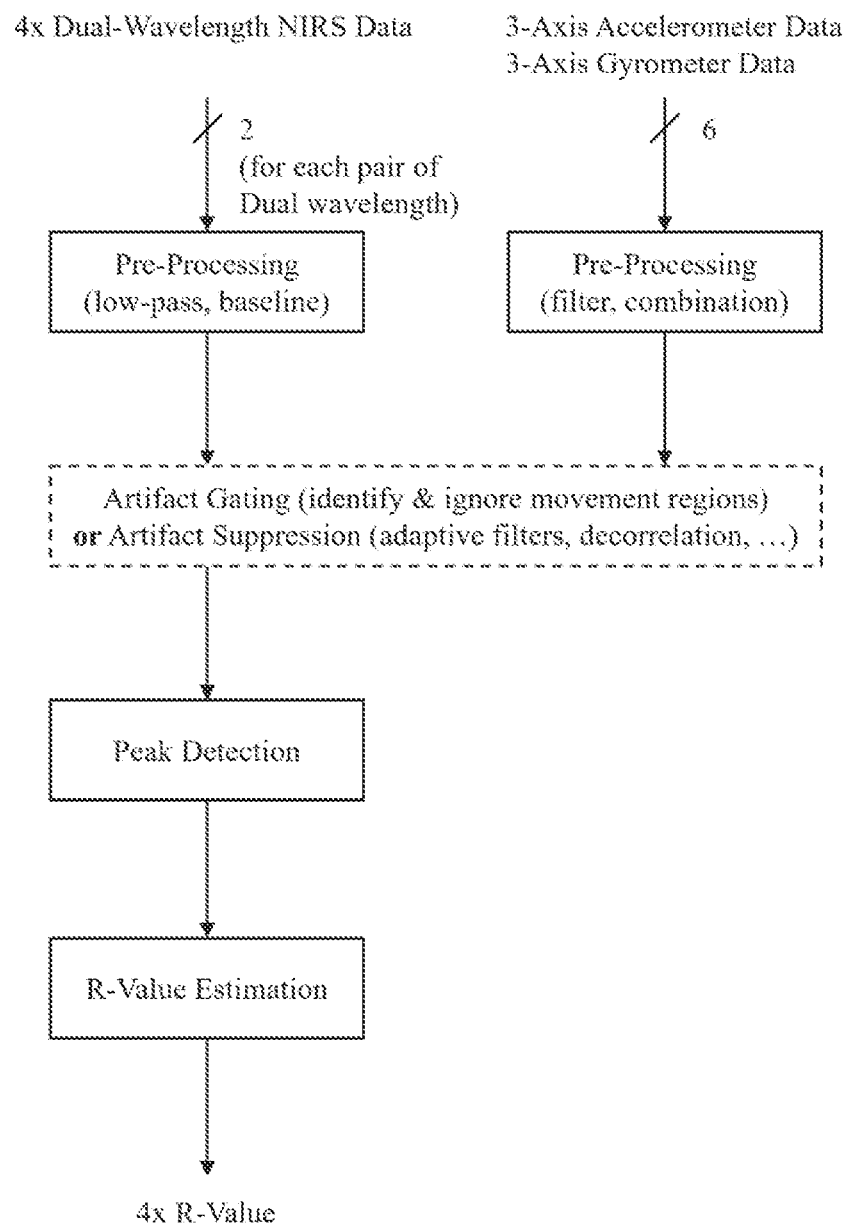

Further, FIG. 3D is a pictorial depiction illustrating exemplary implementation of an algorithm to extract the R-value of the optical data. The R-value is a primary physiological signal. The algorithm uses at least the input of n times-two wavelength reflection data (which is for example, n-times 2 in the image shown, it is n=4 as two detectors and two 2-wavelength-LEDs were used and, thus every LED-PD combination gives one 2-wavelength signal, thus 4 wavelength reflection data) and performs pre-processing, peak detection, different peak to peak analysis methods and R-value estimation. In an exemplary embodiment of the present disclosure, any known algorithm is used for the peak detection. In an exemplary embodiment of the present disclosure, such algorithm calculates R-value by dividing peak-to-peak values of the two wavelengths, performing ratio of peak-to-valley ratios, frequency domain estimation or average signal level estimation and the like. Since, the one or more sensing units 102 have plurality of LEDs and photodetectors, the signals are available multiple times, such as 3 times or 4 times. The actual number of available signals depends on the number of photodetectors and LEDs available on the one or more sensing units 102. The resulting multiple R-values per site may be used to increase the quality of the overall R-value estimate by combining them by averaging or signal-quality based selection. In an embodiment of the present disclosure, each of the number of photodetectors and LEDs may not be less than two and more than four. In an exemplary embodiment of the present disclosure, each of the number of photodetectors and LEDs are two. In an embodiment of the present disclosure, the IMU data including acceleration, gyroscopic and magnetic measurements is used to gate incoming signals i.e., removing selections where a lot of movements is detected or one or more algorithms may also be used to remove influence of movements such as, decorrelation, adaptive filters and the like.

Figure 3E:
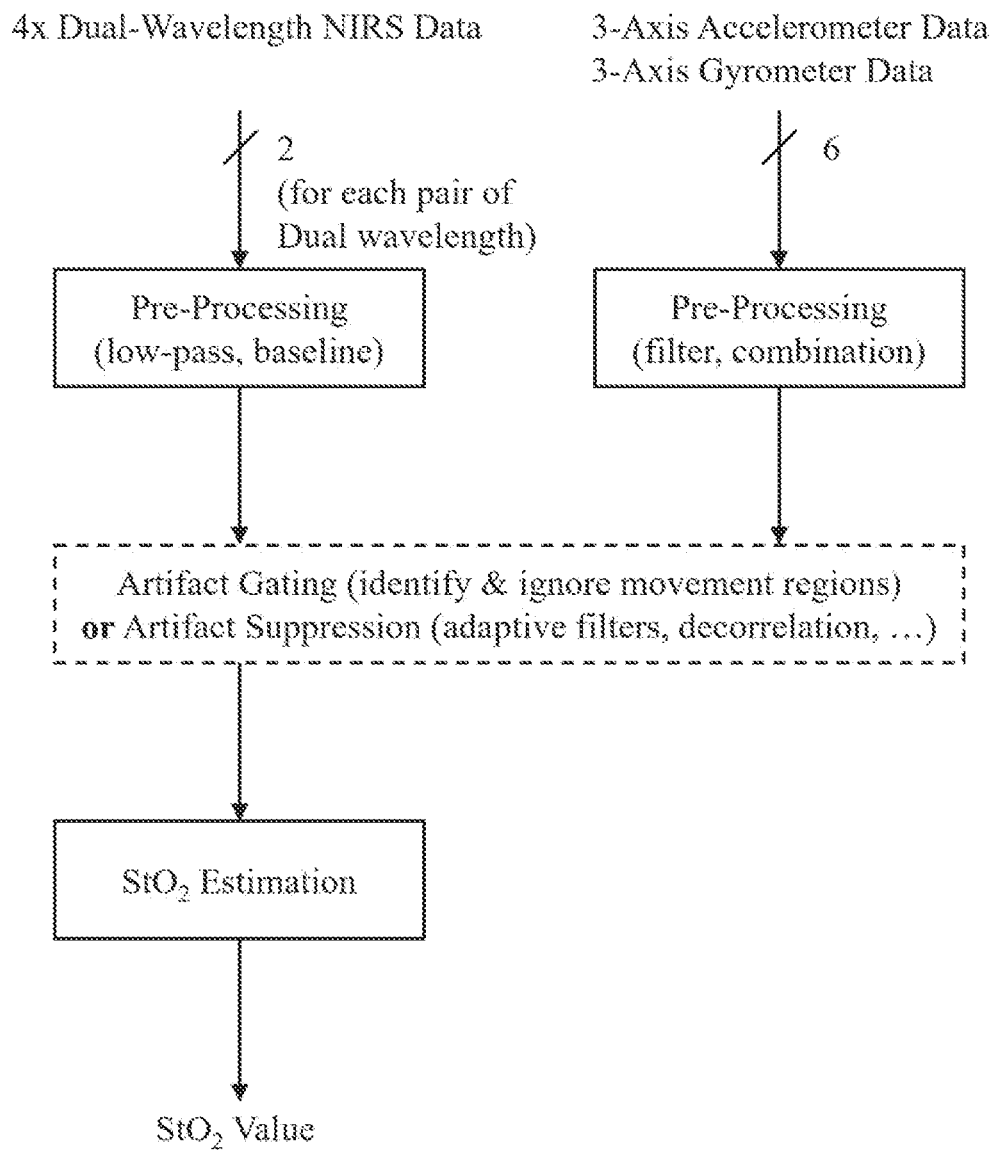

FIG. 3E is a pictorial depiction illustrating exemplary implementation of an algorithm for signal pre-processing and optional artifact removal for StO2 estimation. In an embodiment of the present disclosure, the StO2 is calculated based on the sensor readings by using two or more means. However, more wavelength readings possible with at least two or more means and more different distances are possible. Further, the optional artifact gating of StO2 is performed by performing the method steps as disclosed with respect to FIG. 3D.

Figure 4:
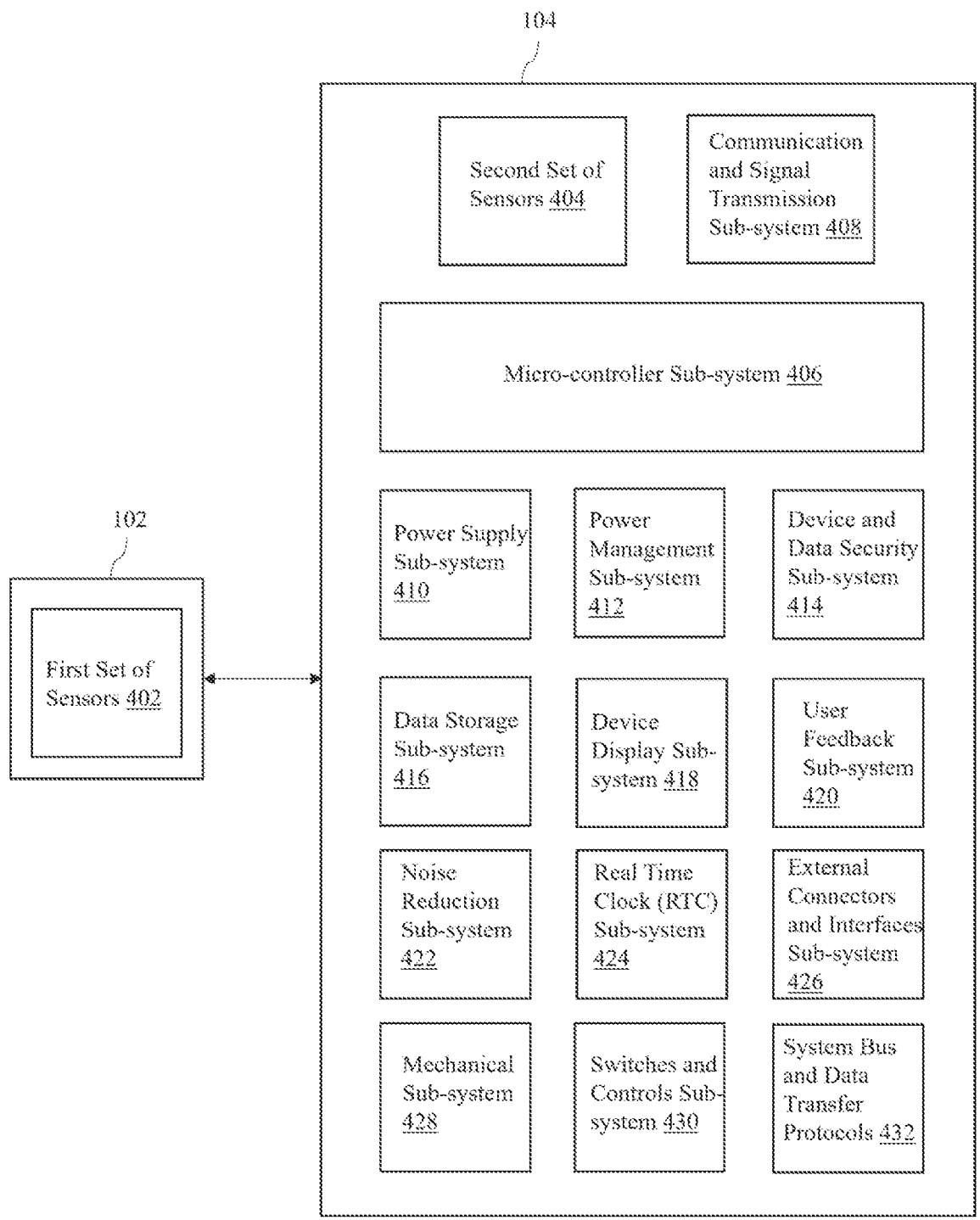
FIG. 4 is a block diagram illustrating an exemplary sensing unit and wearable device capturing the wound site data, the ambient data, the reference site data, the auxiliary data, the patient history data, the patient assessment data and the information associated with the patient.

FIG. 4 is a block diagram illustrating an exemplary sensing unit and wearable device capturing the wound site data, the ambient data, the reference site data, the auxiliary data, the patient history data, the patient assessment data and the information associated with the patient. Although the one or more sensing units 102 and the one or more wearable devices 104, as shown in FIG. 4, are explained with respect to a single patient, it should be understood by the person skilled in the art that the one or more sensing units 102 and the one or more wearable devices 104 may be used by multiple patients for predicting the surgical wound infections. In an embodiment of the present disclosure, each patient may use the one or more sensing units 102 and the one or more wearable devices 104.

Further, the one or more sensing units 102 comprises a wearable patch made of flexible, rigid or a combination of flexible and rigid electronic printed circuit boards enclosed by one or more flexible biocompatible material or a combination thereof. In an exemplary embodiment of the present disclosure, the one or more biocompatible material include rubber, silicone, polyurethane and the like. Furthermore, the one or more sensing units 102 are attached to skin of the patient using an adhesive. The one or more sensing units 102 are connected with the one or more wearable devices 104 via data cables.

Furthermore, the one or more sensing units 102 include a first set of sensors 402 for capturing the one or more physiological changes. In an exemplary embodiment of the present disclosure, the one or more physiological changes include electrical activity, temperature of the body surface, optical properties of the tissue, body movement, electrical properties of the tissue, mechanical activity of the heart, muscle tension and the like. These physiological changes are captured as sensor readings which include electrical potential difference on the skin, emitted IR light on the skin, intensity of light returned from the illuminated tissue, complex tissue impedance, pressure difference on the skin over time, electrical potential difference on the skin, acceleration, gyroscopic and magnetic intensity and the like. In an exemplary embodiment of the present disclosure, the first set of sensors 402 may include temperature sensor, optical sensor, Inertial Measurement Unit (IMU) sensor, electrical impedance sensor, electrical sensor and the like. The temperature sensor is configured to capture temperature data associated with the patient in analog format. In an exemplary embodiment of the present disclosure, the temperature data associated with the patient may be captured by using a thermistor, Infrared (IR) and the like. Further, the temperature sensor converts the captured temperature data from analog format to digital format. The optical sensor includes a plurality of light-Emitting Diodes (LEDs), one or more photodetectors and an analog front end. The plurality of LEDs emit light on tissue of the patient, such that the one or more photodetectors collect analog readings of intensity of light from the illuminated tissue at least two frequencies and across at least two distances between one or more photodetectors. The analog front end converts the collected intensity of light from analog format to digital format. The IMU sensor is an IMU which includes an accelerometer, a gyroscope and a magnetometer. In an embodiment of the present disclosure, the IMU may range from 1-axis to 9-axis with arbitrary combinations of the accelerometer, the gyroscope and the magnetometer. For example, the accelerometer may be a 2-axis accelerometer, the gyroscope may be a 3-axis gyroscope and the magnetometer may be a 3-axis magnetometer. In another example, the accelerometer may be a 3-axis accelerometer, no gyroscope and no magnetometer. In a further example, the gyroscope may be a 1-axis accelerometer, 1 axis magnetometer and no accelerometer. The accelerometer is configured to collect acceleration measurements associated with the patient and the gyroscope is configured to collect gyroscopic measurements associated with the patient. Further, the magnetometer is configured to collect magnetic measurements associated with the patient. The IMU sensor is also configured to convert the collected acceleration, gyroscopic and magnetic measurements from analog format to digital format.

The electrical impedance sensor includes a plurality of electrodes. In an exemplary embodiment of the present disclosure, the plurality of electrodes are arranged in a two-wire configuration, three-wire configuration, a four-wire configuration and the like. In an embodiment of the present disclosure, the plurality of electrodes may be directly integrated into the one or more sensing units 102, connected to the one or more wearable devices 104 through a separate set of cables or connected to the one or more sensing units 102 through a separate set of cables. In an exemplary embodiment of the present disclosure, the plurality of electrodes include two source electrodes and two target electrodes. In an embodiment of the present disclosure, the plurality of electrodes may be placed on both sides or on a single side of the wound to measure impedance value of the wound. The plurality of electrodes in the two-wire configuration capture impedance value of the patient's body. In an exemplary embodiment of the present disclosure, when the plurality of electrodes are arranged in four-wire configuration, at least sensing electrodes of the plurality of electrodes may be micro-needle-based electrodes. Further, when the plurality of electrodes are arranged in three-wire configuration, sensing electrodes of the plurality of electrodes may be micro-needle-based electrodes. Furthermore, when the plurality of electrodes are arranged in two-wire configuration, the plurality of electrodes may be micro-needle-based electrodes. In an embodiment of the present disclosure, the micro-needle-based electrodes reduce interface impedance between patient and analog frontend. Diameter of the micro-needle-based electrodes may be ranging from 450 μm to 550 μm. Furthermore, length of the micro-needle-based electrodes may be ranging from 5 mm to 10 mm. The micro-needle-based electrodes may be inserted into skin of the patient, such that micro-needle-based electrodes enter stratum corneum and penetrate towards epidermis of the patient. The micro-needle-based electrodes do not penetrate beyond the epidermis. In an embodiment of the present disclosure, the set of electrodes are attached to the patient body. In an embodiment of the present disclosure, the electrical impedance sensor measures patient's wound impedance value and respiratory signals. The respiratory signals are a measure of impedance pneumography. The electrical impedance sensor may also be used to perform body composition analysis or comparison between an intact part of the body and the wound site. In an embodiment of the present disclosure, the electrical impedance sensor includes an analog front-end configured to convert the measured wound impedance value from analog format to digital format. Further, the electrical sensor includes a combination of sensors and electrodes to capture ECG, PCG, BCG and EMG of the patient. In an embodiment of the present disclosure, the plurality of electrodes associated with the electrical sensor may be attached to the one or more sensing units 102. In another embodiment of the present disclosure, the plurality of electrodes associated with the electrical sensor may be separately attached to skin of the patient and connected to one or more wearable devices 104. The one or more sensing units 102 also include a plurality of environmental sensors to capture the ambient data. In an exemplary embodiment of the present disclosure, the plurality of environmental sensors include temperature sensor, humidity sensor, pressure sensor, gas sensor, light sensor, noise level sensor and the like. In an exemplary embodiment of the present disclosure, the ambient data may include temperature, humidity, air quality, acoustical noise level, brightness and the like.

Further, the one or more sensing units 102 is communicatively coupled with the one or more wearable devices 104 via data cables. In an exemplary embodiment of the present disclosure, wear duration of the one or more sensing units 102 and the one or more wearable devices 104 are at least 30 days. In an exemplary embodiment of the present disclosure, battery life of the one or more sensing units 102 and the one or more wearable devices 104 are at least 7 days of continuous use. In an embodiment of the present disclosure, the battery life of the one or more sensing units 102 and the one or more wearable devices 104 may be extended by controlling power functions of the one or more sensing units 102 and the one or more wearable devices 104, as described with reference to FIG. 2. The one or more sensing units 102 and the one or more wearable devices 104 may be used along with one or more companion devices. The one or more companion devices may be configured to process data captured by the one or more sensing units 102 and the one or more wearable devices 104 to detect and predict the post-surgical infections. The one or more companion devices include one or more user devices 110, medical equipment or a combination thereof.

Furthermore, the one or more wearable devices 104 include a second set of sensors 404. In an embodiment of the present disclosure, the second set of sensors 404 may be such as those of the first set of sensors 402, with or without any other combination of other sensors. The one or mor wearable devices 104 also include a micro-controller sub-system 406 and a plurality of sub-systems communicatively coupled to the micro-controller sub-system 406. The plurality of sub-systems include a communication and signal transmission sub-system 408, a power supply sub-system 410, a power management sub-system 412, a device and data security sub-system 414, a data storage sub-system 416, a device display sub-system 418, a user feedback sub-system 420, a noise reduction sub-system 422, a Real Time Clock (RTC) sub-system 424, an external connectors and interface sub-system 426, a mechanical sub-system 428, a switches and controls sub-system 430 and a system bus and data transfer protocols 432. Further, the micro-controller sub-system 406 is configured to process sensor readings collected from one or more sensing units 102 and the one or more wearable devices 104.

The communication and signal transmission sub-system 408 is configured to communicate the processed sensor readings to the cloud computing system 106 via the one or more communication protocols.

The power supply sub-system 410 is configured to supply power at one or more voltages to the one or more wearable devices 104. In an embodiment of the present disclosure, the power supply sub-system 410 includes a battery backup domain including one or more internal batteries. The one or more internal batteries include one or more lithium polymer batteries, one or more lithium-ion batteries, one or more silver oxide batteries, one or more lithium zinc batteries or any combination thereof. The one or more internal batteries are configured to ascertain that the Real Time Clock (RTC) sub-system 424 does not loose its date and time when the main power is unavailable. Further, the RTC sub-system 424 is providing a sense of time to the micro-controller sub-system 406. In an embodiment of the present disclosure, precise timing is present inside the micro-controller sub-system 406 alone. In an embodiment of the present disclosure, the one or more internal batteries may be removable and rechargeable. The one or more internal batteries may be rechargeable with a battery pack charger. Further, the data storage sub-system 416 is configured to store the captured sensor readings in on-board storage in encrypted form. In an exemplary embodiment of the present disclosure, the onboard storage is micro-SD (Secure Digital) card or flash drive. The noise reduction sub-system 422 is configured to preprocess the sensor readings to reduce electrical noise and improve the signal to noise ratio. In an embodiment of the present disclosure, the noise reduction sub-system 422 include one or more shielding materials to provide active or passive shielding to photo detector leads, PCB traces and electrode PCS leads. The one or more shielding materials may be conductive materials. In an exemplary embodiment of the present disclosure, the conductive materials may be in solid form, mesh form and the like. The noise reduction sub-system 422 also remove noise from the sensor readings by removing the collected acceleration and gyroscopic measurements from the sensor readings. The noise reduction sub-system 422 uses one or more noise filtration techniques to remove noise from the sensor readings, such as decorrelation, adaptive filtering. Furthermore, the noise reduction sub-system 422 performs active measurement of optical signal quality, adaptive adjustment of analog front ends to increase Signal to Noise Ratio (SNR) based on situation. The mechanical sub-system 428 associated with the one or more wearable devices 104 includes one or more mechanical components to secure casing of the one or more wearable devices 104. In an alternate embodiment of the present disclosure, a mechanical sub-system associated with the one or more sensing units 102 also includes one or more mechanical components to secure casing of the one or more sensing units 102. The mechanical sub-system 428 associated the one or more wearable devices 104 comply with standards for medical devices worn on the patient, such as waterproof, dustproof, wearable, biocompatible, thermal, electrical protection and the like. In an embodiment of the present disclosure, the one or more wearable devices 104 and the one or more sensing units 102 achieve waterproofing and space optimization via the mechanical sub-system 428 associated with the one or more wearable devices 104 and the mechanical sub-system 428 associated with the one or more sensing units 102 respectively. In an alternative embodiment of the present disclosure, the mechanical sub-system 428 associated with the one or more sensing units 102 is flexible and compact. Further, a cable allows sufficient distance between the one or more sensing units 102 and the one or more wearable devices 104. Further, the cable provides an interface between the one or more sensing units 102 and the one or more wearable devices 104, such as optical interface, electrical interface and the like. The mechanical sub-system 428 associated with the one or more wearable devices 104 may use adhesives to secure casing of the one or more wearable devices 104. In an alternative embodiment of the present disclosure, the mechanical sub-system 428 associated with one or more sensing units 102 may also use adhesives to secure casing of the one or more sensing units 102.

The power management sub-system 412 is configured to charge the one or more internal batteries through external sources and control power functions. The power management sub-system 412 also controls power functions of the one or more wearable devices 104 attached on one or more parts of the patient body and the sensing unit 102 attached around surgical area of the patient. The power functions of the one or more wearable devices 104 and the one or more sensing units 102 may be controlled based on one or more controlling parameters. The one or more controlling parameters include status of the wound, activity of the patient, predefined time period of operating the one or more wearable devices 104 and the one or more sensing units 102 and the like. The power functions comprise tuning performance of a system resource associated with the one or more wearable devices 104 based on the trained AI based data model or the trained statistical model, deactivating specific components of the one or more wearable devices 104 to conserve power based on the trained AI based data model or the trained statistical model. In an embodiment of the present disclosure, tuning performance of the system resource includes reducing sampling rate, disabling one or more sensing units 102, switching to intermittent sampling modes, sampling based on one or more events or any combination thereof. For example, the one or more healthcare providers may define time period of operating the one or more wearable devices 104 and the one or more sensing units 102, such that the system resources associated with the one or more wearable devices 104 and the one or more sensing units 102 may only operate in the predefined time period defined by the one or more healthcare providers. In another example, when the IMU sensor detects that the patient may be performing a lot of activities, the power management sub-system 412 may deactivate specific components of the one or more sensing units 102 and the one or more wearable devices 104 as large motion artifacts may be present in data captured by the one or more sensing units 102 and the one or more wearable devices 104. In another example, when data captured by the one or more sensing units 102 and the one or more wearable devices 104 is stable and does not vary for a predefined period time, sampling frequency of data acquisition by the one or more sensing units 102 and the one or more wearable devices 104 may be reduced. The one or more healthcare providers may override one or more actions performed by the power management sub-system 412 for power consumption. In an embodiment of the present disclosure, the power management sub-system 412 may perform the one or more actions based on the command received from the power management module 226.

The device display sub-system 418 is configured to provide a visual display interface for displaying the captured sensor readings of the patient. In an embodiment of the present disclosure, the device display sub-system 418 provides the visual display interface via a display device. In an exemplary embodiment of the present disclosure, the display device may be an electronic-ink display, Liquid-Crystal Display (LCD) or any other display technology. In an embodiment of the present disclosure, the display device may also be a simple LED (Light Emitting Diode) to provide simple updates. The switches and controls sub-system 430 includes one or more mechanical switches to turn power on or off and provide input to micro-controller sub-system 406. In an embodiment of the present disclosure, the one or more mechanical switches include touch switches, contactless switches and the like. The touch switches may be capacitive and resistive. Furthermore, the device and data security sub-system 414 includes a secure crypto processor configured to perform cryptographic operations, embedded in a packaging with plurality of physical security measures. In an embodiment of the present disclosure, the crypto processor is a dedicated computer-on-a-chip or microprocessor.

The user feedback sub-system 420 is configured to disseminate a combination of audio, visual and haptic feedback to the one or more healthcare providers. In an embodiment of the present disclosure, the combination of audio, visual and haptic feedback may be to provide detected presence of the infection, predicted likelihood of infection, the generated wound infection score and one or more medical recommendations for reducing the likelihood of infection. In an exemplary embodiment of the present disclosure, when the one or more healthcare providers does not respond to the disseminated feedback, the user feedback sub-system 420 sends follow-up feedbacks to the one or more healthcare providers. The external connectors and interface sub-system 426 includes plurality of connectors and interfaces to connect the one or more sensing units 102 to Universal Serial Bus (USB) interface connectors via external cables, such that the sensor readings collected by the one or more sensor units may be accessed in absence of Wi-Fi. Further, the system bus and data transfer protocols 432 includes one or more internal connections between the plurality of sub-systems of the one or more wearable devices 104. The one or more internal connections may be Inter-Integrated Circuit (I2C), Serial Peripheral Interface (SPI), Universal Asynchronous Receiver-Transmitter (UART), Controller Area Network (CAN) bus, Local Interconnect Network (LIN), I2S, PDM, Universal Synchronous Asynchronous Receiver Transmitter (USART) or any combination thereof.

Those of ordinary skilled in the art will appreciate that the hardware depicted in FIG. 4 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of the sensing unit or wearable device as is unique to the present disclosure or necessary for an understanding of the present disclosure is depicted and described. The remainder of the construction and operation of the sensing unit or the wearable device may conform to any of the various current implementation and practices known in the art.

Figure 5A:
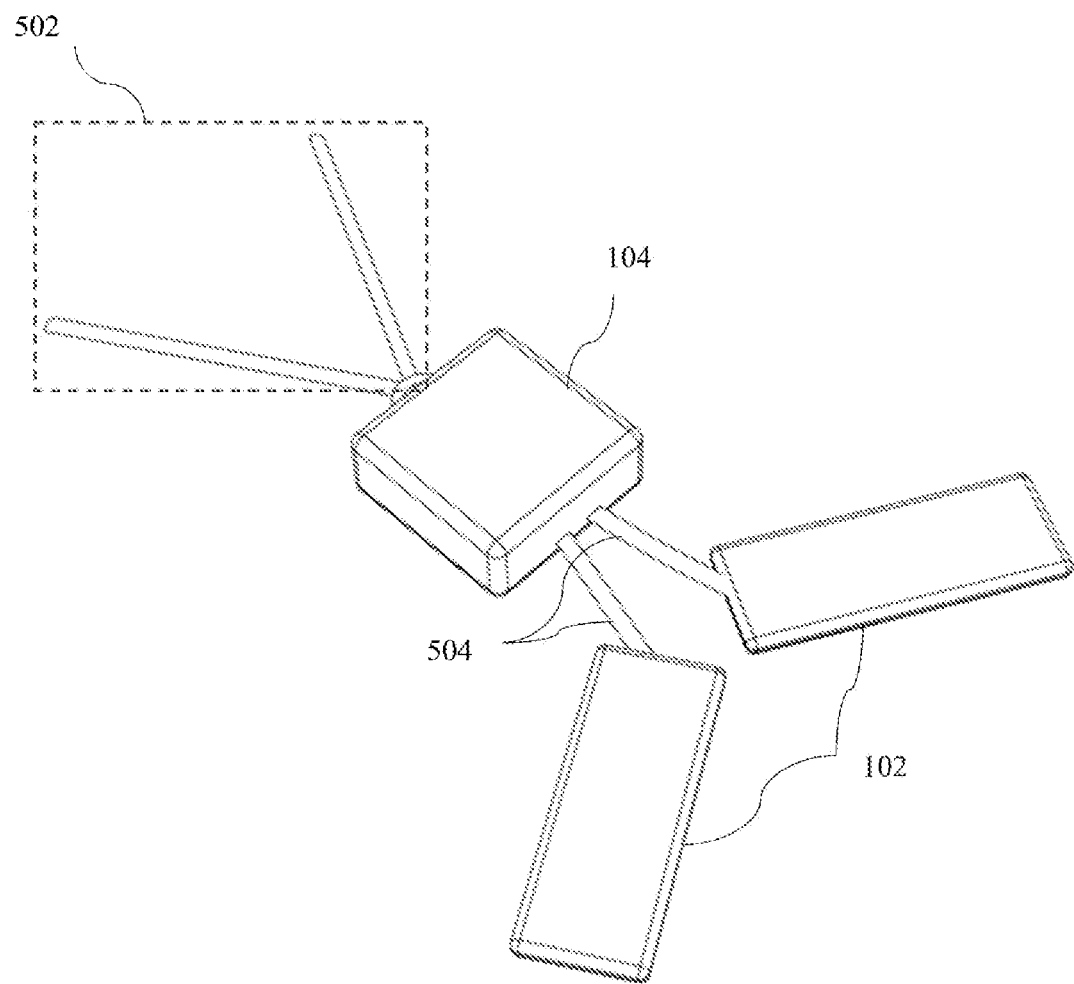
FIG. 5A-C is a pictorial depiction illustrating the one or more sensing units and the one or more wearable devices attached on one or more body parts of patient, in accordance with an embodiment of the present disclosure.
Figure 5B:
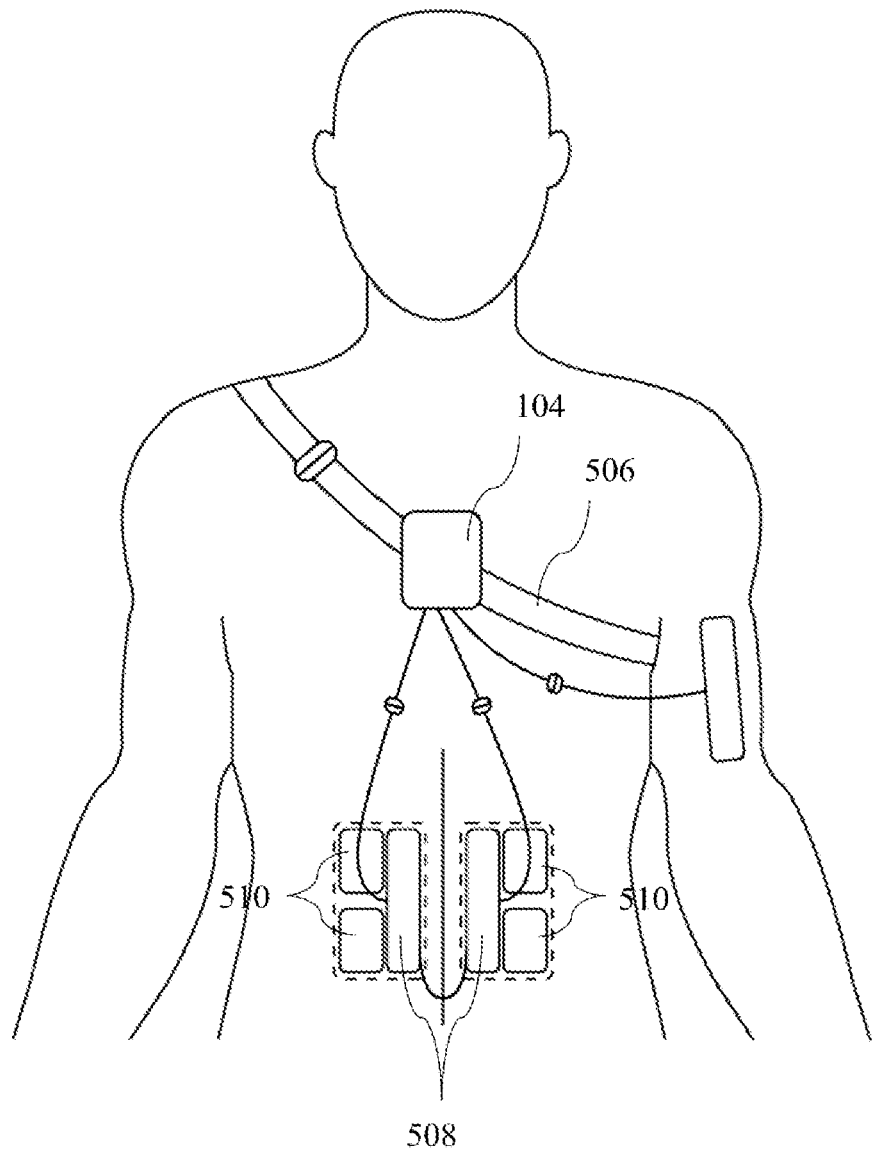
Figure 5C:
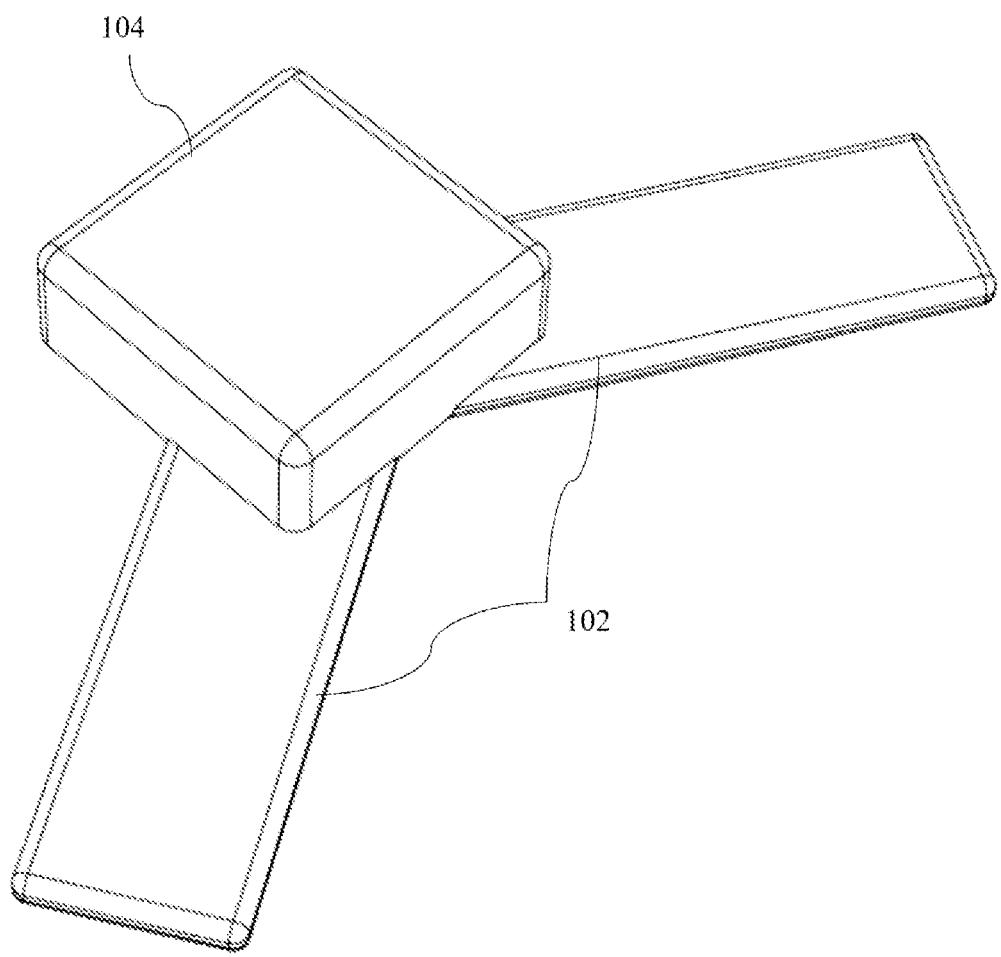

FIG. 5A-C is a pictorial depiction illustrating the one or more sensing units 102 and the one or more wearable devices 104 attached on one or more body parts of patient, in accordance with an embodiment of the present disclosure. In FIG. 5A, a lanyard 502, which may be a cord or strap worn around the neck, is attached to the one or more wearable devices 104. Further, the one or more wearable devices 104 may be secured to the patient body with an adhesive patch or may be left hanging from the lanyard. Furthermore, the one or more sensing units 102 are connected to the one or more wearable devices 104 using the data cable 504, as shown in FIG. 5A.

Further, in FIG. 5B, the one or more wearable devices 104 may be worn around the patient's torso in a sling pouch. In FIG. 5B, the one or more sensing units 102 include two sensors 508 and four electrodes 510. Both sensors 508 may be attached in any configuration, such as unilaterally or bilaterally along the length of the wound using an adhesive, at a distance of 25 mm medial and distal to surgical incision.

Furthermore, in FIG. 5C, the one or more sensing units 102 and the one or more wearable devices 104 are integrated to form a single integrated unit. The integrated unit comprising the one or more sensing units 102 and the one or more wearable devices 104 is attached to the skin of the patient using adhesive.

Figure 6:
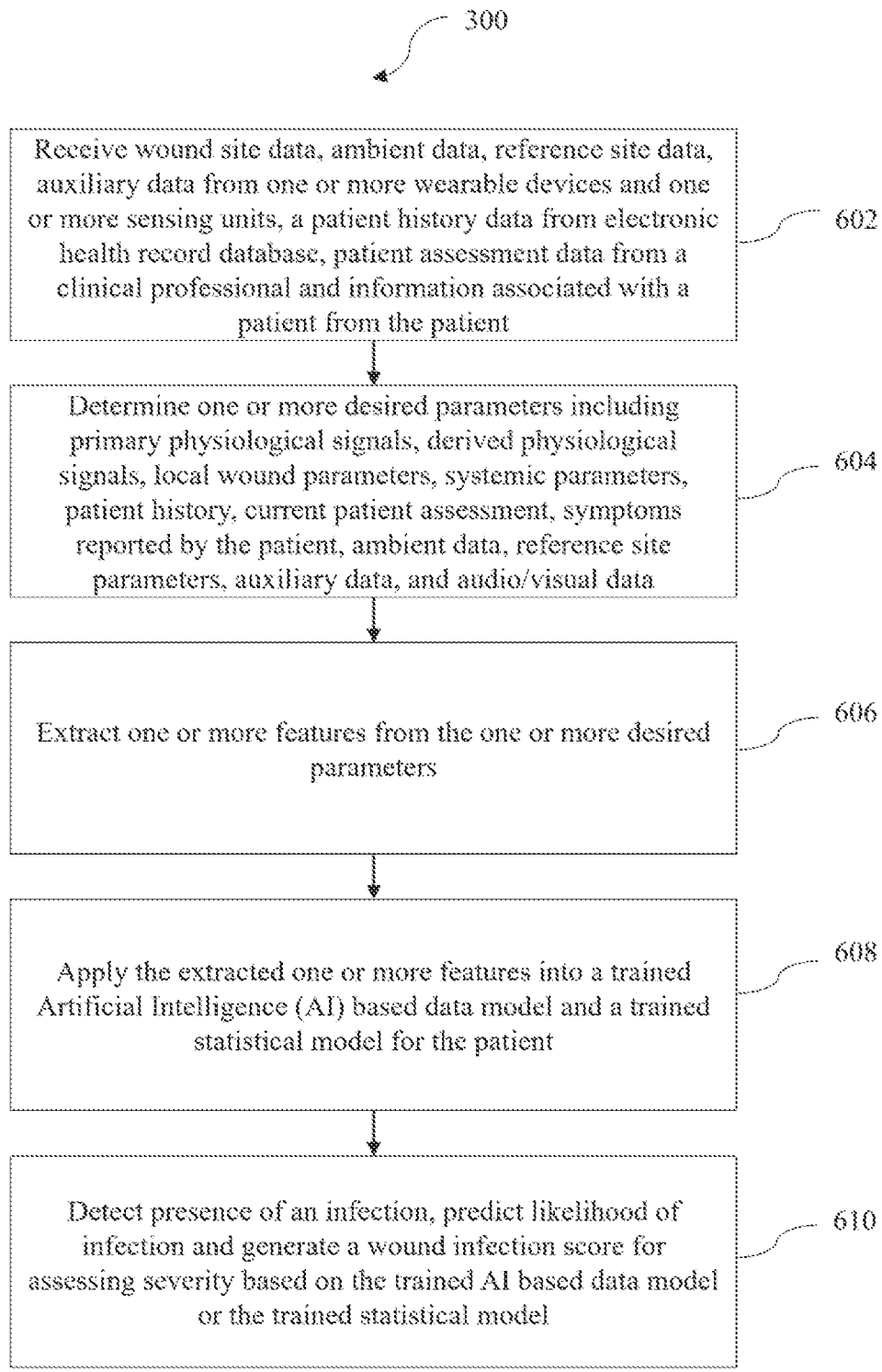
FIG. 6 is a process flow diagram illustrating an exemplary method for detecting and predicting surgical wound infections, in accordance with an embodiment of the present disclosure.

FIG. 6 is a process flow diagram illustrating an exemplary method for detecting and predicting surgical wound infections, in accordance with an embodiment of the present disclosure. At step 602, wound site data, ambient data, reference site data and auxiliary data are received from one or more wearable devices 104, one or more sensing units 102 or any combination thereof, a patient history data is received from electronic health record database, patient assessment data is received from a clinical professional, information associated with a patient is received from the patient or any combination thereof. In an embodiment of the present disclosure, the received data may be separated into segments of any lengths. For example, the received data may be separated into time-stamped 30-minute-long segments. In an embodiment of the present disclosure, the wound site data is captured from surgical wound area of the patient. In an exemplary embodiment of the present disclosure, the wound site data includes skin temperature, plethysmogram, $SpO_2$, $StO_2$ complex tissue impedance, electrodermal activity, Electromyogram (EMG), respiration rate, perfusion index, intensity of light returned from illuminated tissue, acceleration, gyroscopic and magnetic field strength, body impedance value, Electrocardiogram (ECG), electric potential difference on the skin, ECG based heart rate, heart rate variability, impedance pneumography, impedance cardiogram, BCG based heart rate, PCG based heart rate, respiration rate, variability, emitted IR light on the skin, pulse rate, activity, posture, position, step count, pressure differences on the skin over time, Phonocardiogram (PCG), Ballistocardiogram (BCG), cardiovascular parameters, electrical activity of the heart, temperature of body surface, optical properties of the tissue, body movement, mechanical activity of the heart, muscle tension, electrical potential difference on the skin and the like. The reference site data is captured from one or more parts of the patient body other than the surgical wound area of the patient. In an embodiment of the present disclosure, the reference site data is similar to and includes all the above-mentioned data of the wound site data, however these data are captured from a different location. In other words, reference site data includes same data as that of the wound site data mentioned above but for a different location on patient body. Further, the ambient data include temperature, humidity, air quality, acoustical noise level, brightness and the like. The auxiliary data include Personal Identifiable Information (PII), dates, timestamps, status information associated with the one or more sensing units 102 and the one or wearable devices 104 and the like. The PII may be the information used to identify the patient, such as name and contact information of the patient. The patient may also be identified via a medical record number associated with the patient. In an embodiment of the present disclosure, the patient assessment data include data associated with monitoring of the patient and follow-ups conducted by the clinical professional in the hospital or outpatient setting. The patient history data include demographic information, vital signs, diagnoses, medications, lab and test results, BMI, medical history, habits, such as smoking, sport and the like, chronic diseases, acute diseases, age and the like. Further, information associated with the patient received from the patient include one or more symptoms reported by the patient.

In an embodiment of the present disclosure, the received wound site data, the received ambient data, the received reference site data, the received auxiliary data, the received patient history data, the received patient assessment data and the received information associated with the patient are locally preprocessed by the one or more wearable devices 104 attached on one or more parts of the patient body.

At step 604, one or more desired parameters are determined. The one or more desired parameters include primary physiological signals, derived physiological signals, local wound parameters, systemic parameters, patient history, current patient assessment, symptoms reported by the patient, ambient data, reference site parameters, auxiliary data, audio/visual data and the like. In an embodiment of the present disclosure, the one or more desired parameters are determined based on the received wound site data, the received ambient data, the received reference site data and the received auxiliary data from the one or more wearable devices 104, the one or more sensing units 102 or any combination thereof, the received patient history data from the electronic health record database, the received patient assessment data from the clinical professional, the received information associated with the patient from the patient or any combination thereof.

At step 606, one or more features are extracted from the one or more desired parameters. In an exemplary embodiment of the present disclosure, the one or more features include, maximum, minimum, median, entropy, complexity, fractal dimension, distinct points comprising peaks, valleys, inflection points and the like.

At step 608 the extracted one or more features are applied into a trained Artificial Intelligence (AI) based data model, a trained statistical model for the patient or any combination thereof. In an exemplary embodiment of the present disclosure, the trained AI based data model and the trained statistical model may include decision trees, Random forests Logistic Regression, Multilayer Perceptron (MLP), Support Vector Machine (SVM), Recurrent Artificial Neural Network (ANN), Long Short-Term Memory (LSTM), Time Delay Neural Network (TDNN), Dynamic Bayesian Networks, Hidden Markov Models, Deep Learning Architectures, Ensemble models, Stacked models and the like. Before using the trained AI based data model or the trained statistical model, it is required to train the AI based data model and the statistical model for detecting presence of the infection, predicting likelihood of the infection, generating the wound infection score and the like. In an embodiment of the present disclosure, the AI based data model and the statistical model are trained based on the extracted one or more features and past medical outcomes pre-stored in a storage unit 206. In training the AI based data model and the statistical model based on the extracted one or more features and the past medical outcomes pre-stored in the storage unit 206, the method 600 includes mapping the extracted one or more features with the past medical outcomes. Further, the method 600 includes assigning a weightage to each of the mapped one or more features with the past medical outcomes. The weightage may be a nonlinear function. The method 600 includes training the AI based data model, the statistical model or a combination thereof for the patient based on the one or more features and the past medical outcomes.

At step 310, the method 600 includes detecting presence of an infection around proximal region of the surgical wound area, predicting likelihood of infection around the proximal region of the surgical wound area, generating a wound infection score for assessing severity of the infection or any combination thereof based on the trained AI based data model or the trained statistical model or any combination thereof.

Further, the method 600 includes outputting the detected presence of the infection, the predicted likelihood of the infection and the generated wound infection score to one or more user devices 110 associated with one or more healthcare providers via a secure communication network 108. In an embodiment of the present disclosure, the one or more healthcare providers may access the detected presence of the infection, the predicted likelihood of the infection and the generated wound infection score by using the web application or mobile application on the one or more user devices 110. In an exemplary embodiment of the present disclosure, the one or more user devices 110 include a laptop computer, desktop computer, tablet computer, smartphone, wearable device, smart watch and the like. In outputting the detected presence of the infection, the predicted likelihood of the infection and the generated wound infection score to the one or more user devices 110 associated with the one or more healthcare providers via the secure communication network 108, the method 600 includes publishing the detected presence of the infection, the predicted likelihood of the infection and the generated wound infection score to the one or more user devices 110 associated with the one or more healthcare providers via the secure communication network 108. Further, the method 600 includes receiving one or more medical recommendations for reducing the likelihood of infection from the one or more user devices 110 associated with the one or more healthcare providers. In an embodiment of the present disclosure, the method 600 includes facilitating collaboration between the one or more healthcare providers to discuss best course of treatment for reducing the likelihood of infection. The method 600 includes transmitting the received one or more medical recommendations for reducing the likelihood of infection to the one or more healthcare providers. In an embodiment of the present disclosure, the one or more health care providers may access the one or more medical recommendations by using the web application or mobile application on the one or more user devices 110. The one or more medical recommendations may be in the form of vocal, haptic and visual modes and at a frequency determined by the one or more healthcare providers. The frequency is a rate at which the one or more healthcare providers requires the one or more medical recommendations. For example, the one or more healthcare providers may require the one or more medical recommendations daily, weekly or monthly. The one or more recommendations may be stored in the storage unit 206.

Furthermore, the method 600 includes controlling power functions of the one or more wearable devices 104 attached on one or more parts of the patient body and the one or more sensing units 102 attached around surgical wound area of the patient. In an embodiment of the present disclosure, the power functions are controlled by tuning performance of a system resource associated with the one or more wearable devices 104, deactivating specific components of the one or more sensing units 102, the one or more wearable devices 104 or a combination thereof to conserve power or a combination thereof based on the trained AI based data model or the statistical model. In an exemplary embodiment of the present disclosure, tuning performance of the system resource include reducing sampling rate, disabling one or more sensing units 102, switching to intermittent sampling modes, sampling based on one or more events or any combination thereof. In an exemplary embodiment of the present disclosure, the one or more events include movements, rapidly changing signals and the like. The sampling rate may also be increased based on the one or more events.

The method 600 may be implemented in any suitable hardware, software, firmware, or combination thereof.

Figure 7:
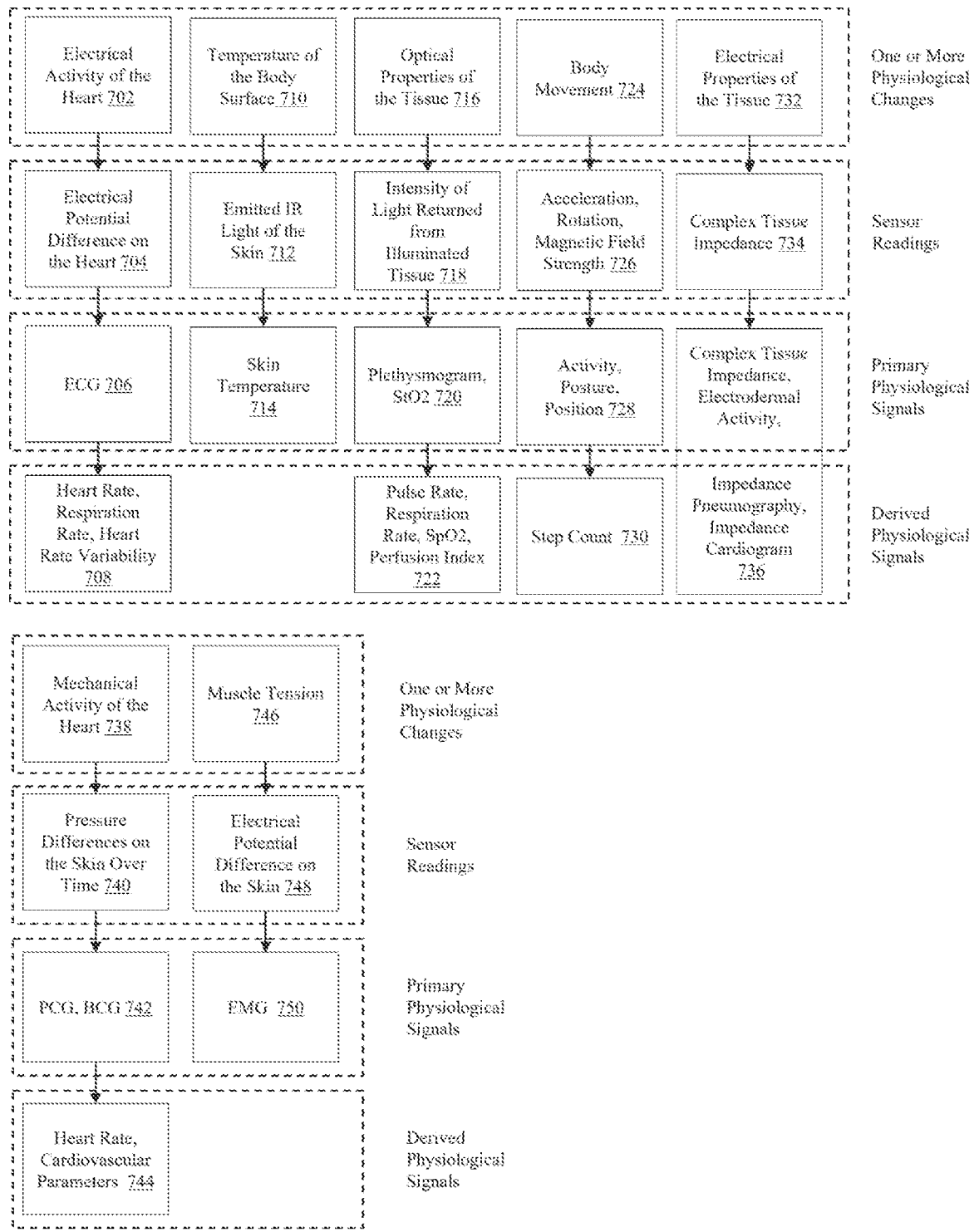
FIG. 7 is a process flow diagram illustrating examples of one or more physiological changes, sensor readings, primary physiological signals and derived physiological signals, in accordance with an embodiment of the present disclosure.

FIG. 7 is a process flow diagram illustrating examples of one or more physiological changes, sensor readings, primary physiological signals and derived physiological signals, in accordance with an embodiment of the present disclosure. In an embodiment of the present disclosure, the one or more sensor units 102, the one or more wearable devices 104 or a combination thereof capture the one or more physiological changes in the form of sensor readings. Further, the primary physiological signals are obtained from the sensor readings. Furthermore, the derived physiological signals are derived from the primary physiological signals. For example, electrical activity of the heart 702 is captured as electrical potential difference on the skin 704, such that ECG 706 may be obtained based on the electrical potential difference on the skin 704, as shown in FIG. 7. Further, ECG based heart rate, respiration rate heart rate variability 708 are derived from the ECG 706. Similarly, temperature of the body surface 710 is captured as emitted IR light on the skin 712, such that skin temperature 714 may be obtained based on the emitted IR light on the skin 712. Further, optical properties of the tissue 716 is captured as intensity of light returned from illuminated tissue 718, such that plethysmogram and StO2 720 may be obtained based on the intensity of light returned from illuminated tissue 718. Furthermore, the pulse rate, respiration rate, SpO2 and perfusion index 722 are derived from the plethysmogram and StO2 720. Body movement 724 is captured as acceleration, rotation and magnetic field strength 726, such that activity, posture and position 728 may obtained from the acceleration, rotation and magnetic field strength 726. Further, the step count 730 is derived from the activity, posture and position 728.

Further, electrical properties of the tissue 732 is captured as the complex tissue impedance 734, such that the complex tissue impedance, electrodermal activity, impedance pneumography and impedance cardiogram 736 may be obtained from the complex tissue impedance 734. Mechanical activity of the heart 738 is captured as pressure difference on the skin over time 740, such that PCG and BCG 742 may be obtained from the pressure difference on the skin over time 740. Furthermore, heart rate and cardiovascular parameters 744 are derived from the PCG and BCG 742. Muscle Tension 746 is captured as electrical potential difference on the skin 748, such that EMG 750 is captured based on the electrical potential difference on the skin 748.

Figure 8:
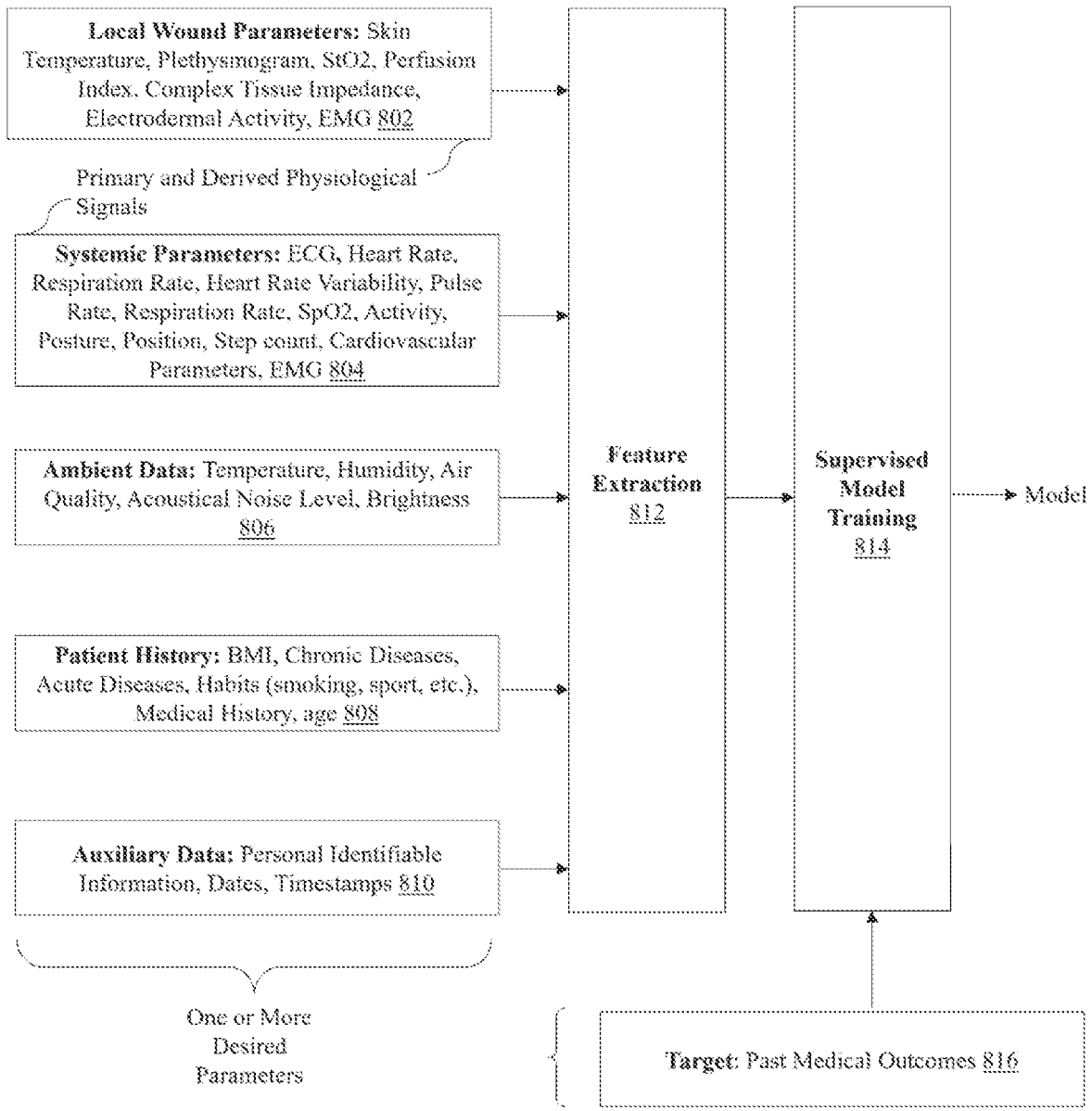
FIG. 8 is a block diagram depicting training of AI based data model and statistical model, in accordance with an embodiment of the present disclosure.

FIG. 8 is a block diagram depicting training of AI based data model and statistical model, in accordance with an embodiment of the present disclosure. The cloud computing system 106 receives the wound site data, the ambient data, the reference site data, the auxiliary data, the patient history data, the patient assessment data and the information associated with the patient, as described with reference to FIG. 2. The cloud computing system 106 determines the one or more desired parameters based on the received wound site data, the received ambient data, the received reference site data, the received auxiliary data, the received patient history data, the received patient assessment data and the received information associated with the patient. In an exemplary embodiment, considering if at the stage of determination of the one or more desired parameters, the primary physiological data and the derived physiological data of both the wound site data and the reference site data are classified as local parameters and systemic parameters. In this scenario, some of the primary physiological data and the derived physiological data may be classified as either one or both of the local wound parameters and systemic parameters such that the local wound parameters includes skin temperature, plethysmogram, StO2, perfusion index, complex tissue impedance, electrodermal activity and EMG 802, and the systemic parameters includes ECG, heart rate, respiration rate, heart rate variability, pulse rate, respiration rate, SpO2, activity, posture, position, step count, cardiovascular parameters and EMG 804. In further such embodiment the ambient data may include temperature, humidity, air quality acoustical noise level and brightness 806, the patient history may include BMI, chronic diseases, acute diseases, habits (smoking, sport, etc.), medical history and age 808 and the auxiliary data may include Personal Identifiable Information, dates and timestamps 810, as shown in FIG. 8. Further, the cloud computing system 106 performs feature extraction 812 by extracting the one or more features from the one or more desired parameters. Furthermore, the cloud computing system 106 performs supervised model training 814 by training the AI based data model and the statistical model based on the extracted one or more features and the past medical outcomes 816, as shown in FIG. 8.

Figure 9:
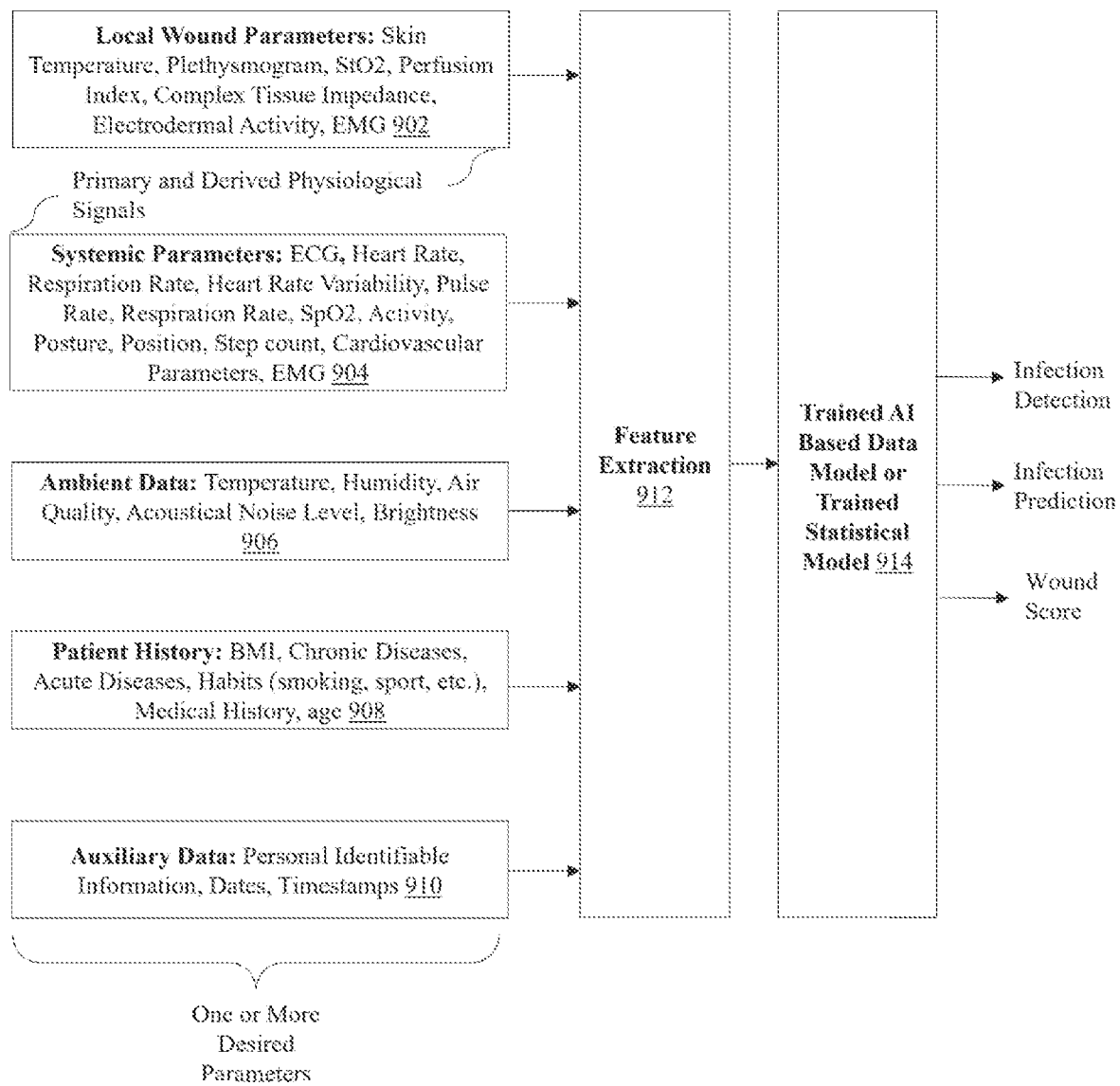
FIG. 9 is a block diagram depicting application of AI based data model and statistical model, in accordance with an embodiment of the present disclosure.

FIG. 9 is a block diagram depicting application of AI based data model and statistical model, in accordance with an embodiment of the present disclosure. The cloud computing system 106 receives the wound site data, the ambient data, the reference site data, the auxiliary data, the patient history data, the patient assessment data and the information associated with the patient, as described with reference to FIG. 2. The cloud computing system 106 determines the one or more desired parameters based on the received wound site data, the received ambient data, the received reference site data, the received auxiliary data, the received patient history data, the received patient assessment data and the received information associated with the patient. In another exemplary embodiment, considering if at the stage of determination of the one or more desired parameters, the primary physiological data and the derived physiological data of both the wound site data and the reference site data are classified as local parameters and systemic parameters. In this scenario, some other of the primary physiological data may be classified as either one or both of the local wound parameters and systemic parameters such that the local wound parameters includes skin temperature, plethysmogram, StO2, perfusion index, complex tissue impedance, electrodermal activity and EMG 902, and the systemic parameters includes ECG, heart rate, respiration rate, heart rate variability, pulse rate, respiration rate, SpO2, activity, posture, position, step count, cardiovascular parameters and EMG 904. Furthermore, the ambient data may include temperature, humidity, air quality acoustical noise level and brightness 906, the patient history may include BMI, chronic diseases, acute diseases, habits (smoking, sport, etc.), medical history and age 908 and the auxiliary data may include Personal Identifiable Information, dates and timestamps 910, as shown in FIG. 9. Further, the cloud computing system 106 performs feature extraction 912 by extracting one or more features from the one or more desired parameters. Furthermore, the cloud computing system 106 applies the extracted one or more features into the trained Artificial Intelligence (AI) based data model or the trained statistical model 914 for detecting presence of an infection, predicting likelihood of infection and generating the wound infection score, as shown in FIG. 9.

Figure 10:
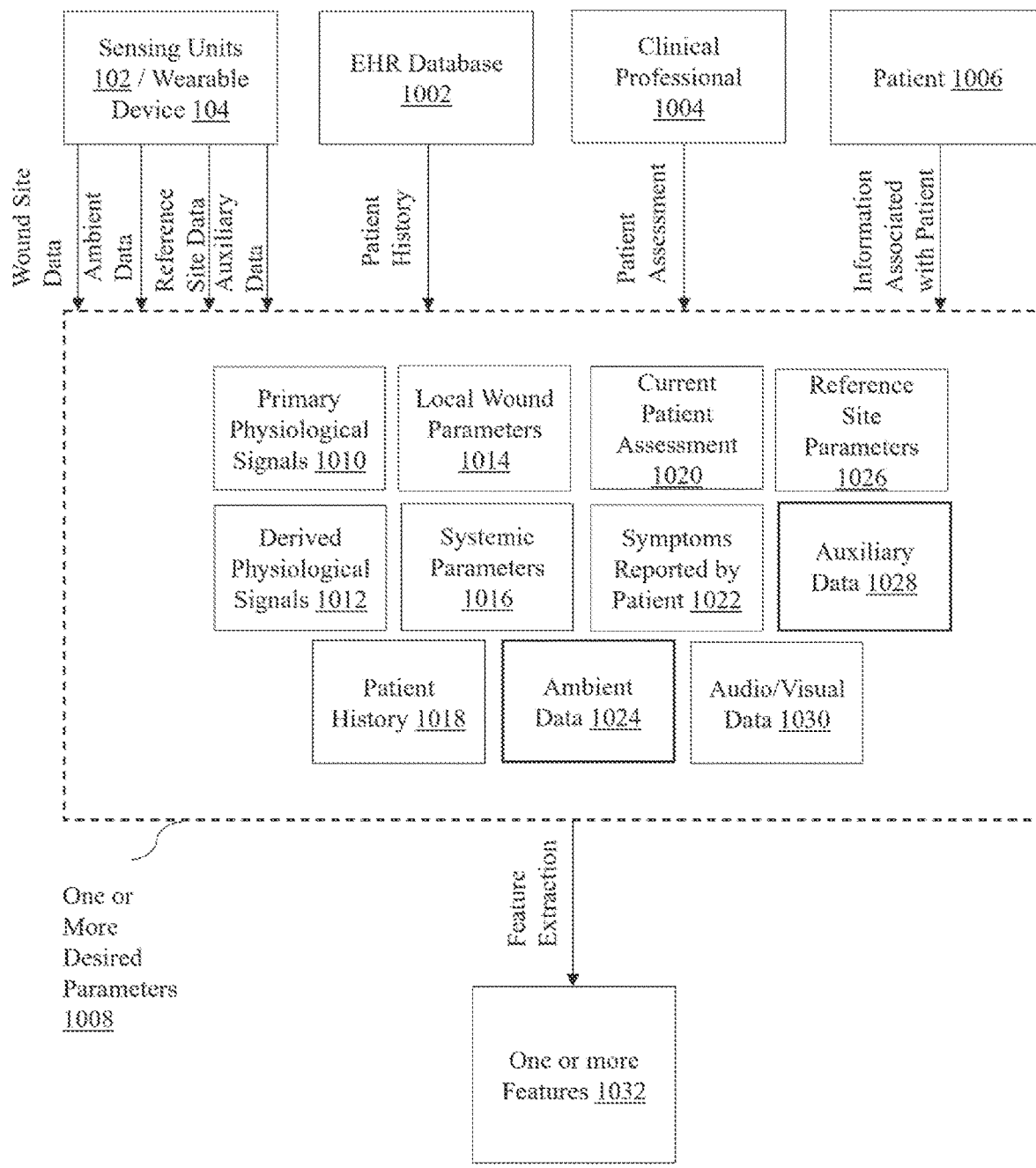
FIG. 10 is a block diagram depicting an exemplary process flow until output of feature extraction, in accordance with an embodiment of the present disclosure.

FIG. 10 is a block diagram depicting an exemplary process flow until output of feature extraction, in accordance with an embodiment of the present disclosure. The cloud computing system 106 receives the wound site data, the ambient data, the reference site data and the auxiliary data from the one or more wearable devices 104, the one or more sensing units 102 or any combination thereof, the patient history data from the electronic health record database 1002, the patient assessment data from the clinical professional 1004, information associated with the patient from the patient 1006 or any combination thereof. Further, the cloud computing system 106 determines the one or more desired parameters 1008 including primary physiological signals 1010, derived physiological signals 1012, local wound parameters 1014, systemic parameters 1016, patient history 1018, current patient assessment 1020, symptoms reported by the patient 1022, ambient data 1024, reference site parameters 1026, auxiliary data 1028, and audio/visual data 1030 based on the received wound site data, the received ambient data, the received reference site data, the received auxiliary data, the received patient history data, the received patient assessment data, the received information associated with the patient or any combination thereof. Furthermore, the cloud computing system 106 performs feature extraction by extracting the one or more features 1032 from the one or more desired parameters 1008.

Thus, various embodiments of the present cloud computing system 106 provide a fast and reliable solution for detecting and predicting surgical wound infections. Since, the cloud computing system 106 replaces the conventional mechanism of physically inspecting the wound to predict the surgical wound infections, the cloud computing system 106 is fast and reliable. Further, the cloud computing system 106 detects and predicts likelihood of infection and outputs the predicted likelihood to the one or more healthcare providers. Thus, the one or more health care providers are not required to be physically present in proximity of the patient. Furthermore, the micro-needle electrodes used by the one or more sensing units 102 accurately measure bio-imperial parameters as the micro-needle electrodes have least impact of skin shedding. The one or more sensing units 102 and the one or more wearable devices 104 have software and hardware tamper resistance. Further, the cloud computing system 106 also transmit the one or more medical recommendations to the one or more healthcare providers for reducing the likelihood of infection.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A system for detecting and predicting surgical wound infections, the system comprising:
   one or more wearable devices;
   one or more sensing units, wherein the one or more wearable devices and the one or more sensing units are arranged in a sling pouch worn around a neck of a patient, the one or more sensing units and the one or more wearable devices connected via a data cable, the sling pouch comprising a lanyard for securing the sling pouch around the neck of the patient, the one or more sensing units comprising sensors arranged unilaterally or bilaterally along a length of a wound of the patient; and
   a cloud computing system comprising:
   one or more hardware processors; and
   a memory coupled to the one or more hardware processors, wherein the memory comprises a plurality of modules in the form of programmable instructions executable by the one or more hardware processors, wherein the plurality of modules comprises:
a data receiver module configured to receive wound site data, ambient data, reference site data, and auxiliary data from at least one of the one or more wearable devices and one or more sensing units, patient history data from an electronic health record database, patient assessment data from a clinical professional, and information associated with a patient from the patient,
wherein the received wound site data, the received ambient data, the received reference site data, the received auxiliary data, the received patient history data, the received patient assessment data, and the received information associated with the patient are continuously monitored and received at a predefined time interval and locally pre-processed by the one or more wearable devices attached on one or more parts of the patient body;
a parameter determination module configured to determine one or more desired parameters comprising: primary physiological signals, derived physiological signals, local wound parameters, systemic parameters, patient history, current patient assessment, symptoms reported by the patient, ambient data, reference site parameters, auxiliary data, and audio/visual data, wherein the one or more desired parameters are determined based on the wound site data, the ambient data, the reference site data, and the auxiliary data from the one or more wearable devices and the one or more sensing units, the patient history data from the electronic health record database, the patient assessment data from the clinical professional, and the information associated with the patient from the patient;
a feature extraction module configured to extract one or more features from the one or more desired parameters, wherein the one or more features comprise: energy, maximum, minimum, median, entropy, complexity, fractal dimension, distinct points comprising peaks, valleys, zero crossings, and inflection points, transformations and their coefficients and features within transformed signals, wherein the transformations include Laplace, Fourier, wavelet, cosine, further statistical moments, coefficients of functional fits, normalization parameters, dimensionality reduced versions, principal components, linear discriminant analysis, and percentiles;
an inference module configured to apply the extracted one or more features into a trained Artificial Intelligence (AI) based data model and a trained statistical model for the patient;
a data management module configured to perform:
detecting presence of an infection around proximal region of a surgical wound area based on output of the trained AI based data model and the trained statistical model;
predicting likelihood of infection around the proximal region of the surgical wound area based on the output of the trained AI based data model and the trained statistical model; and
generating a wound infection score for assessing severity of the infection based on the output of the trained AI based data model and the trained statistical model; and
a power management module configured to control power functions of the one or more wearable devices attached on the one or more parts of the patient body and the one or more sensing units attached around the surgical wound area of the patient, wherein controlling the power functions comprises deactivating specific components of the one or more sensing units and the one or more wearable devices to conserve power based on the output of the trained AI based data model and the trained statistical model.

2. The system of claim 1, wherein the plurality of modules further comprises an artificial intelligence module configured to train the AI based data model and the statistical model based on the extracted one or more features and past medical outcomes pre-stored in a storage unit.

3. The system of claim 1, wherein the plurality of modules further comprises a data output module configured to output the detected presence of the infection, the predicted likelihood of the infection, and the generated wound infection score to one or more user devices associated with one or more healthcare providers via a secure communication network.

4. The system of claim 3, wherein in outputting the detected presence of the infection, the predicted likelihood of the infection, and the generated wound infection score to the one or more user devices associated with the one or more healthcare providers via the secure communication network, the data output module is further configured to:
publish the detected presence of the infection, the predicted likelihood of the infection, and the generated wound infection score to the one or more user devices associated with the one or more healthcare providers via the secure communication network;
receive one or more medical recommendations for reducing the likelihood of infection from the one or more user devices associated with the one or more healthcare providers; and
transmit the received one or more medical recommendations for reducing the likelihood of infection to the one or more healthcare providers, wherein the one or more medical recommendations may be in the form of at least one of or a combination of: vocal, acoustic, haptic and visual modes and at a frequency determined by the healthcare providers.

5. The system of claim 1, wherein the power management module is further configured to:
tune performance of a system resource associated with the one or more wearable devices based on the output of the trained AI based data model and the trained statistical model, wherein tuning performance of the system resource comprises reducing sampling rate, switching to intermittent sampling modes, and sampling based on one or more events.

6. The system of claim 2, wherein in training the AI based data model and the statistical model based on the extracted one or more features and the past medical outcomes pre-stored in the storage unit, the artificial intelligence module is further configured to:
map the extracted one or more features with the past medical outcomes;
assign a weightage to each of the mapped one or more features with the past medical outcomes; and train the AI based data model and the statistical model for the patient based on the one or more features and the past medical outcomes.

7. The system of claim 1, wherein the one or more wearable devices and the one or more sensing units further comprises a set of sensors configured for continuous monitoring and capturing sensor readings associated with the patient at a predefined time interval; and
    a plurality of subsystems communicatively coupled to a micro-controller sub system and the set of sensors, wherein the plurality of subsystems are configured for locally processing the wound site data, the ambient data, the reference site data, and the auxiliary data associated with the patient.

8. The system of claim 7, wherein the wound site data, the ambient data, the reference site data, and the auxiliary data associated with the patient are derived from the captured sensor readings.

9. The system of claim 7, wherein the plurality of subsystems comprises:
    a power management sub-system configured to charge one or more internal batteries through external sources and control power functions;
    a power supply sub-system configured to supply power at one or more voltages;
    a communication and signal transmission sub-system configured to communicate the processed sensor readings, processed bio signals of the patient, and processed patient's wound impedance value to a cloud computing system; and
    a mechanical sub-system comprises one or more mechanical components to secure casing of the one or more wearable devices and the one or more sensing units.

10. The system of claim 9, wherein the power management sub-system is further configured to:
    control power functions of the one or more wearable devices attached on the one or more parts of the patient's body and the one or more sensing unit attached around a surgical area of one or more patients, wherein controlling the power functions comprises:
        tuning performance of a system resource associated with the one or more wearable devices based on the output of the trained AI based data model; and
        deactivating the specific components of the one or more wearable devices to conserve power based on the output of the trained AI based data model.

11. The system of claim 7, wherein one subset of the set of sensors comprises tissue oxygen saturation (StO2) sensors, bioimpedance (BioZ) sensors, and skin and ambient temperature measurement sensors, inertial measurement unit (IMU) sensors, electrocardiogram measurement (ECG) sensors, and electromyography measurement (EMG) sensors.

* * * * *